(12) United States Patent
Brigg et al.

(10) Patent No.: US 11,715,175 B2
(45) Date of Patent: Aug. 1, 2023

(54) HIERARCHICAL TILING IN A GRAPHICS PROCESSING SYSTEM USING CHAIN SORTING OF PRIMITIVES

(71) Applicant: Imagination Technologies Limited, Kings Langley (GB)

(72) Inventors: Robert Brigg, Watford (GB); Lorenzo Belli, Watford (GB)

(73) Assignee: Imagination Technologies Limited, Kings Langley (GB)

( * ) Notice: Subject to any disclaimer, the term of this patent is extended or adjusted under 35 U.S.C. 154(b) by 0 days.

(21) Appl. No.: 17/504,813

(22) Filed: Oct. 19, 2021

(65) Prior Publication Data

US 2022/0036501 A1     Feb. 3, 2022

Related U.S. Application Data

(63) Continuation of application No. 17/026,506, filed on Sep. 21, 2020, now Pat. No. 11,151,685.

(30) Foreign Application Priority Data

Sep. 19, 2019  (GB) .................................. 1913538

(51) Int. Cl.
  *G06T 1/20*      (2006.01)
  *G06T 1/60*      (2006.01)
  *G06T 15/00*     (2011.01)
(52) U.S. Cl.
  CPC ............... *G06T 1/60* (2013.01); *G06T 1/20* (2013.01); *G06T 15/005* (2013.01)
(58) Field of Classification Search
  CPC ............ G06T 1/20; G06T 1/60; G06T 15/005
  (Continued)

(56) References Cited

U.S. PATENT DOCUMENTS 9,317,948 B2     4/2016  Tapply et al.
2015/0348306 A1*  12/2015  Yang ....................... G06T 15/04
                                                        345/420

(Continued)

FOREIGN PATENT DOCUMENTS

CN      106897143 A     6/2017
CN      103824276 B     2/2019

(Continued)

OTHER PUBLICATIONS

Sang et al., "Fast Tile-Binning Method by Detecting 1D-Overlapped Primitives," 2013 IEEE International Conference an Consumer Electronics (ICCE), Jan. 2013, pp. 147-148.

(Continued)

*Primary Examiner* — Jacinta M Crawford
(74) *Attorney, Agent, or Firm* — Potomac Law Group, PLLC; Vincent M DeLuca

(57) ABSTRACT

Tiling engines and methods for hierarchically tiling a plurality of primitives. A chain of sorting units includes a top level sorting unit followed by lower level sorting units, the top level sorting unit determining which of a plurality of regions of a render space each of the plurality of primitives at least partially falls within. For each region a primitive at least partially falls within an identifier of that primitive is stored in a queue. Each of the lower level sorting units selects queues of a preceding sorting unit in the chain to process, and determines which of a plurality of sub-regions of the region associated with that queue each of the primitives at least partially falls within. For each such sub-region an identifier of that primitive is stored in a queue of the lower level sorting unit that is associated with that sub-region. An output unit outputs the primitives identified in the queues of the last lower level sorting unit in the chain on a queue by queue basis.

20 Claims, 17 Drawing Sheets

(58) Field of Classification Search
USPC .................................................. 345/506, 530
See application file for complete search history.

(56) References Cited

U.S. PATENT DOCUMENTS

| | | |
|---|---|---|
| 2017/0262951 A1 | 9/2017 | Smith |
| 2018/0307533 A1 | 10/2018 | Tian et al. |
| 2019/0188896 A1 | 6/2019 | Heggelund et al. |
| 2019/0355091 A1 | 11/2019 | Gierach et al. |

FOREIGN PATENT DOCUMENTS

| | | |
|---|---|---|
| GB | 2433014 A | 6/2007 |
| GB | 2549789 A | 11/2017 |
| GB | 2570744 A | 8/2019 |

OTHER PUBLICATIONS (Note: copy of NPL in parent application).

\* cited by examiner

HIERARCHICAL TILING IN A GRAPHICS PROCESSING SYSTEM USING CHAIN SORTING OF PRIMITIVES

CROSS-REFERENCE TO RELATED APPLICATIONS AND CLAIM OF PRIORITY

This application is a continuation under 35 U.S.C. 120 of copending application Ser. No. 17/026,506 filed Sep. 21, 2020, now U.S. Pat. No. 11,151,685, which claims foreign priority under 35 U.S.C. 119 from United Kingdom Application No. 1913538.3 filed Sep. 19, 2019.

BACKGROUND

Graphics processing systems are configured to receive graphics data, e.g. from an application (e.g. a game application) running on a computer system, and to render an image from the graphics data to provide a rendering output. For example, an application may generate a 3D model of a scene and output geometry data representing the objects in the scene. In particular, the application may represent each object using one or more primitives (i.e. simple geometric shapes, such as, but not limited to rectangles, triangles, lines and points to which a texture can be applied) which are defined by the position of one or more vertices. In these cases, the geometry data output by the application may include information identifying each vertex (e.g. the coordinates of the vertex in world space) and information indicating the primitives formed by the vertices. The graphics processing system then converts the received geometry data into an image that may be displayed on a screen.

A graphics processing system may, for example, implement immediate mode rendering (IMR) or tile-based rendering (TBR). In IMR the entire scene is rendered as a whole. In contrast, in TBR a scene is rendered using a rendering space which is divided into subsections, which are referred to as tiles, wherein at least a portion of the rendering process may be performed independently for each tile. The tiles may have any suitable shape, but are typically rectangular (wherein the term "rectangular" includes square). An advantage of TBR is that fast, on-chip memory can be used during the rendering for colour, depth and stencil buffer operations, which allows a significant reduction in system memory bandwidth over IMR, without requiring on-chip memory that is large enough to store data for the entire scene at the same time.

TBR involves two key phases: a geometry processing phase; and a rasterization phase. During the geometry processing phase the geometry data (e.g. vertices defining primitives) received from an application (e.g. a game application) is transformed from world space coordinates into screen space coordinates. A per-tile list is then created of the transformed primitives (e.g. triangles) that, at least partially, fall within the bounds of the tile. During the rasterization phase each tile is rendered separately (i.e. the transformed primitives are mapped to pixels and the colour is identified for each pixel in the tile). This may comprise identifying which primitive(s) are visible at each pixel. The colour of each pixel may then be determined by the appearance of the visible primitive(s) at that pixel which may be defined by a texture applied at that pixel and/or the pixel shader program run on that pixel. A pixel shader program describes operations that are to be performed for given pixels. Rendering each tile separately enables the graphics processing system to only retrieve the transformed primitive data related to a particular tile when rendering that tile in the rasterization phase, which keeps bandwidth requirements for the memory (e.g. intermediate buffer) low. Once a colour value has been identified for each pixel in a tile the colour values for the tile are written out to memory (e.g. a frame buffer). Once the entire scene has been rendered (i.e. once colour values have been determined for the pixels of all of the tiles) the scene may be, for example, displayed on a screen.

FIG. 1 illustrates an example TBR graphics processing system 100. The system 100 comprises memory $102_1$, $102_2$, $102_3$, $102_4$, geometry processing logic 104 and rasterization logic 106. Two or more of the memories $102_1$, $102_2$, $102_3$, and $102_4$ may be implemented in the same physical unit of memory.

The geometry processing logic 104 implements the geometry processing phase of TBR. The geometry processing logic 104 comprises transformation logic 108 and a tiling engine 110. The transformation logic 108 receives geometry data (e.g. vertices, primitives and/or patches) from an application (e.g. a game application) and transforms the geometry data into the rendering space (e.g. screen space). The transformation logic 108 may also perform functions such as clipping and culling to remove geometry data (e.g. primitives or patches) that falls outside of a viewing frustum, and/or apply lighting/attribute processing as is known to those of skill in the art. The transformed geometry data (e.g. vertices, primitives and/or patches) is (i) stored in the memory $102_2$, and (ii) provided to the tiling engine 110. The tiling engine 110 generates, from the transformed geometry data, a list, for each tile, of the transformed primitives that fall, at least partially, within that tile. The list may be referred to as a display list or a transformed display list. In some cases, the transformed display lists comprise pointers or links to the transformed geometry data (e.g. vertex data) related to the primitives that, at least partially, fall within the tile.

The rasterization logic 106 implements the rasterization phase of TBR. Specifically, the rasterization logic 106 renders the primitives in a tile-by-tile manner by fetching the display list for a tile from memory $102_3$ and then fetching the transformed geometry data from memory $102_2$ for the primitives that fall within the tile as indicated by the display list for that tile; and rendering the primitives for that tile based on the transformed geometry data.

In some cases, the rasterization logic 106 may comprise a rasterizer 112, hidden surface removal (HSR) logic 114 and texturing/shading logic 116. In these cases, the rasterizer 112 fetches each of the display lists from memory $102_3$ and for each display list fetches the transformed geometry data from memory $102_2$ for the primitives that fall within a tile as specified by the corresponding display list, and converts each primitive into a set of primitive fragments. The term "fragment" is used herein to mean a sample of a primitive at a sampling point, which is to be processed to render pixels of an image. In some examples, there may be a one-to-one mapping of pixels to fragments. However, in other examples there may be more fragments than pixels, and this oversampling can allow for higher quality rendering of pixel values, e.g. by facilitating anti-aliasing and other filters that may be applied to multiple fragments for rendering each of the pixel values.

The primitive fragments for a particular tile are then provided to the HSR logic 114 which removes primitive fragments which are hidden (e.g. hidden by other primitive fragments) by performing depth testing on the primitive fragments. The remaining fragments (after hidden surface removal) are then passed to the texturing/shading logic 116 which performs texturing and/or shading on the primitive fragments to determine pixel values of a rendered image. The rendered pixel values for a tile are then stored in memory $102_4$ (e.g. frame buffer).

The rasterization logic 106 processes each of the tiles and when the whole image has been rendered and stored in the memory $102_4$ (e.g. frame buffer) the image can be output from the graphics processing system 100 and used in any suitable manner, for example, displayed on a display, stored in memory, or transmitted to another device, etc. The TBR graphics processing system 100 shown in FIG. 1 is a "deferred" rendering system in the sense that fragments are processed by the HSR logic 114 before being processed by the texturing/shading logic 116. In other examples, the graphics processing system might not be a deferred rendering system in which case texturing/shading would be applied to fragments before HSR is applied to those fragments.

The embodiments described below are provided by way of example only and are not limiting of implementations which solve any or all of the disadvantages of known methods and systems for tiling primitives in a graphics processing system.

SUMMARY

This summary is provided to introduce a selection of concepts that are further described below in the detailed description. This summary is not intended to identify key features or essential features of the claimed subject matter, nor is it intended to be used to limit the scope of the claimed subject matter.

Described herein are tiling engines and methods for use in a graphics processing system for hierarchically tiling a plurality of primitives. The tiling engine includes: a chain of sorting units comprising a top level sorting unit followed by one or more lower level sorting units, wherein: the top level sorting unit is configured to: determine which of a plurality of regions of a render space each of the plurality of primitives, at least partially, falls within; and for each region a primitive, at least partially, falls within, store an identifier of that primitive in a queue of the top level sorting unit that is associated with that region; and each of the one or more lower level sorting units is configured to: select one or more queues of a preceding sorting unit in the chain to process; for each of the selected queues, determine which of a plurality of sub-regions of the region associated with the selected queue each of the primitives identified in that queue, at least partially, falls within; and for each sub-region a primitive, at least partially, falls within, store an identifier of that primitive in a queue of the lower level sorting unit that is associated with that sub-region; and an output unit configured to output the primitives identified in the queues of a last lower level sorting unit in the chain on a queue by queue basis.

A first aspect provides a tiling engine for use in a graphics processing system, the tiling engine comprising: a chain of sorting units comprising a top level sorting unit followed by one or more lower level sorting units, wherein: the top level sorting unit is configured to: determine which of a plurality of regions of a render space each of a plurality of primitives, at least partially, falls within; and for each region a primitive, at least partially, falls within, store an identifier of that primitive in a queue of the top level sorting unit that is associated with that region; and each of the one or more lower level sorting units is configured to: select one or more queues of a preceding sorting unit in the chain to process; for each of the selected queues, determine which of a plurality of sub-regions of the region associated with the selected queue each of the primitives identified in the selected queue, at least partially, falls within; and for each sub-region a primitive, at least partially, falls within, store an identifier of that primitive in a queue of the lower level sorting unit that is associated with that sub-region; and an output unit configured to output the primitives identified in the queues of a last lower level sorting unit in the chain on a queue by queue basis.

The top level sorting unit may be configured to determine whether a primitive, at least partially, falls within a region using a first tiling method and at least one of the one or more lower level sorting units is configured to determine whether a primitive, at least partially, falls within a sub-region using a second, different, tiling method.

The first tiling method may be less precise than the second tiling method.

The top level sorting unit may be configured to determine whether a primitive, at least partially, falls within a region using a bounding box method, the bounding box method comprising identifying an axis-aligned bounding box that encompasses the primitive and determining that the primitive, at least partially, falls within the region if the bounding box, at least partially, overlaps with the region.

At least one of the one or more lower level sorting units may be configured to select the queue of the preceding sorting unit in the chain to process next by selecting one of: a longest queue of the preceding sorting unit, a newest queue of the preceding sorting unit, a queue of the preceding sorting unit that is associated with a region closest to the region of the most recently processed queue of the preceding sorting unit, and an oldest queue of the preceding sorting unit.

The one or more lower level sorting units may comprise at least two lower level sorting units and one of the lower level sorting units may be configured to select one or more queues of the preceding sorting unit in the chain to process using a first method and another of the lower level sorting units may be configured to select one or more queues of the preceding sorting unit in the chain to process using a second, different, method.

The primitives may be stored in a buffer and the identifier of a primitive may comprise information indicating a location of that primitive in the buffer.

The primitives may be stored in the buffer in primitive blocks, wherein each primitive block comprises a plurality of primitives, and the identifier of a primitive may comprise information identifying the primitive block to which that primitive forms part of.

The tiling engine may further comprise a storing unit configured to generate the primitive blocks by grouping spatially similar primitives in the same primitive block.

The storing unit may be configured to generate the primitive blocks by: determining which of a plurality of macro regions of the render space each primitive, at least partially, falls within; adding that primitive to at least one primitive block associated with a macro region that the primitive, at least partially, falls within; and when a primitive block associated with a macro region becomes full, storing the primitive block in the buffer.

The storing unit may be configured to, in response to determining that a primitive, at least partially, falls within a plurality of macro regions, add that primitive to a primitive block associated with each of the macro regions that the primitive, at least partially, falls within.

The storing unit may be configured to determine that a primitive block associated with a macro region is full when: that primitive block has a maximum size, that primitive block comprises a maximum number of primitives, and/or each primitive is associated with one or more vertices and that primitive block comprises a maximum number of vertices.

A memory of the buffer may be divided into a plurality of chunks and the storing unit may be configured to only store primitive blocks associated with a same macro region in a same chunk.

A memory of the buffer may be divided into a plurality of physical chunks of size K; a virtual memory may be divided into a plurality of virtual memory chunks of size $(M+1)*K$, each virtual memory chunk being mapped to $(M+1)$ physical chunks, wherein a maximum size of a primitive block is $M*K$ wherein M is an integer greater than or equal to two; and the tiling engine may further comprise a storing unit configured to write a primitive block to a virtual memory chunk only if the primitive block starts in a first K-sized block of the virtual memory chunk.

A size of the regions of the top level sorting unit and/or a size of the sub-regions of at least one of the one or more lower level sorting units may be configurable.

At least one region or at least one sub-region may be a non-contiguous region of the render space.

At least one of the one or more lower level sorting units may comprise a plurality of queues and the at least one lower level sorting unit may be configured to dynamically associate the plurality of queues with the sub-regions.

At least one lower level sorting unit may be further configured to: in response to determining that a primitive, at least partially, falls within a sub-region, determine whether a queue of the plurality of queues of that lower level sorting unit is associated with that sub-region; in response to determining that a queue of the plurality of queues of the lower level sorting unit is associated with that sub-region, add an identifier of that primitive to the queue associated with that sub-region; in response to determining that a queue of the plurality of queues of that lower level sorting unit is not associated with that sub-region, determine if one of the plurality of queues of the lower level sorting unit is free; and in response to determining that one of the plurality of queues of the lower level sorting unit is free, associate the free queue of the lower level sorting unit to the sub-region and add an identifier of the primitive to that queue.

Each of the one or more lower level sorting units may be configured to, for each selected queue of the preceding sorting unit in the chain, remove the primitive identifiers from the selected queue.

At least one lower level sorting unit may be configured to determine that a queue of the lower level sorting unit is free when that queue does not comprise any primitive identifiers.

The number of lower level sorting units in the tiling engine may be configurable.

A second aspect provides a method of sorting a plurality of primitives based on regions of a render space, the method comprising: executing a chain of sorting phases comprising a top level sorting phase followed by one or more lower level sorting phases, wherein the top level sorting phase comprises: determining which of a plurality of regions of the render space each of the primitives, at least partially, falls within; and for each region a primitive, at least partially, falls within, storing an identifier of that primitive in a queue of the top level sorting phase that is associated with that region; and each of one or more lower level sorting phases comprises: selecting one or more queues of a preceding sorting phase in the chain to process; for each of the selected queues, determining which of a plurality of sub-regions of the region associated with the selected queue each of the primitives identified in the selected queue, at least partially, falls within; and for each sub-region a primitive, at least partially, falls within, storing an identifier of that primitive in a queue of the lower level sorting phase that is associated with that sub-region; and selectively outputting the primitives identified in the queues of a last lower level sorting phase in the chain on a queue by queue basis.

A third aspect provides a tiling engine configured to perform the method of the second aspect.

A fourth aspect provides a graphics processing system comprising the tiling engine of the first aspect or the third aspect.

The tiling engines and graphics processing systems described herein may be embodied in hardware on an integrated circuit. There may be provided a method of manufacturing, at an integrated circuit manufacturing system, an integrated circuit embodying a tiling engine and/or a graphics processing system described herein. There may be provided an integrated circuit definition dataset that, when processed in an integrated circuit manufacturing system, configures the system to manufacture an integrated circuit embodying a tiling engine or a graphics processing system described herein. There may be provided a non-transitory computer readable storage medium having stored thereon a computer readable description of a tiling engine or a graphics processing system described herein that, when processed in an integrated circuit manufacturing system, causes the integrated circuit manufacturing system to manufacture an integrated circuit embodying the tiling engine or the graphics processing system.

There may be provided an integrated circuit manufacturing system comprising: a non-transitory computer readable storage medium having stored thereon a computer readable description of a tiling engine or a graphics processing system described herein; a layout processing system configured to process the computer readable description so as to generate a circuit layout description of an integrated circuit embodying the tiling engine or the graphics processing system; and an integrated circuit generation system configured to manufacture an integrated circuit embodying the tiling engine or the graphics processing system according to the circuit layout description.

There may be provided computer program code for performing a method as described herein. There may be provided non-transitory computer readable storage medium having stored thereon computer readable instructions that, when executed at a computer system, cause the computer system to perform the methods as described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1:
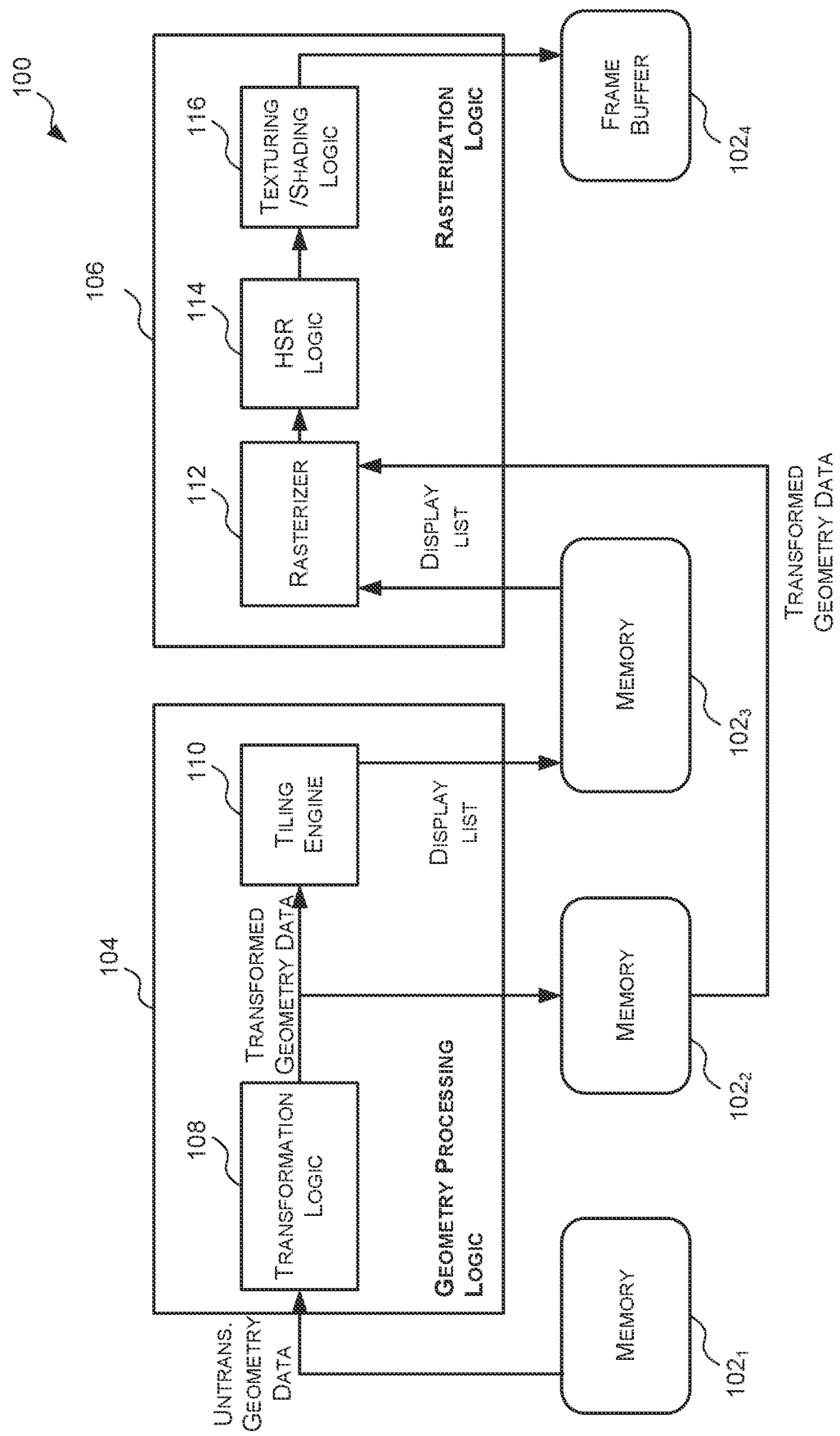
FIG. 1 is a block diagram of an example tile-based rendering graphics processing system.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art. Embodiments are described by way of example only.

As described above, by rendering each tile separately a TBR graphics processing system only has to retrieve the transformed primitive data related to a particular tile when rendering that tile in the rasterization phase, which keeps bandwidth requirements for the memory (e.g. intermediate buffer) to a minimum. However, TBR typically requires use of system memory for storing the transformed geometry data for an entire frame, which typically requires a significant amount of bandwidth for transferring data (e.g. transformed geometry data) between the chip on which the geometry processing logic 104 and rasterization logic 106 are implemented and the memory which is typically situated "off-chip". Accordingly, to take advantage of some of the benefits of TBR while reducing the amount of data transferred to and from the memory the applicant has developed a "hybrid rendering" technique, which as its name suggests, is a hybrid between immediate mode rendering and TBR.

In hybrid rendering the rendering space is divided into tiles and the primitives are associated with tiles like in TBR. Accordingly, in hybrid rendering there is also a geometry processing phase and a rasterization phase. However, while in TBR the display lists that are generated by the geometry processing phase include, where possible, a list of all of the transformed primitives that fall, at least partially, within a particular tile for a particular render, in hybrid rendering the display lists generated for respective tiles by the geometry processing phase may include identifiers of only a subset of the transformed primitives that fall, at least partially, within the respective tiles, thus they may be referred to herein as partial display lists. Specifically, in TBR, if possible, all the transformed primitives are stored in off-chip memory and then display lists are generated for respective tiles that refer to the transformed primitives stored in memory. In contrast, in hybrid rendering the transformed primitives are stored in relatively small memory (e.g. on-chip memory, such as, a local buffer) and partial display lists are generated for each tile that refer to the transformed primitives in the small memory. The small memory (e.g. local buffer) is not intended to be necessarily large enough to store all of the transformed primitives for a render, so as transformed primitives are generated in the geometry processing phase they are stored in the small memory and partial display lists are built up for the transformed primitives stored in the small memory. Periodically partial display lists are provided to the rasterization phase so that some of the transformed primitives can be processed in the rasterization phase, such that they no longer need to be stored in (and can be removed from) the small memory, thereby freeing up a portion of the small memory. New transformed primitives can then be stored in the free space in the small memory and the partial display lists continue to be built up based on the new transformed primitives. Since the partial display list for a particular tile may be sent to the rasterization phase before all of the transformed primitives for that tile have been stored in the small memory, at least one subsequent partial list may be generated for that tile that comprises the transformed primitives that were stored in the small memory after the previous partial display list for that tile was provided to the rasterization phase.

Figure 2:
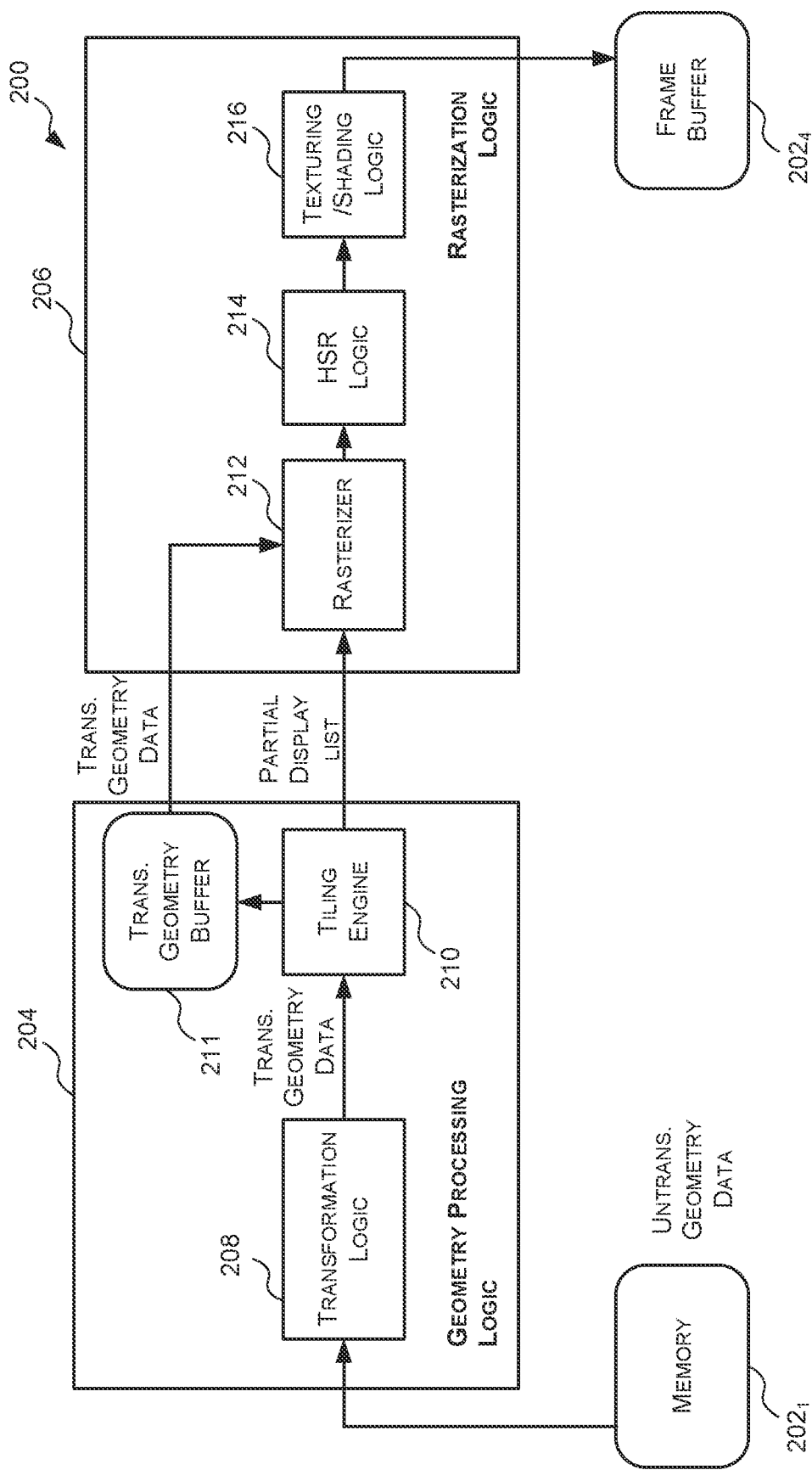
FIG. 2 is a block diagram of an example hybrid rendering graphics processing system.

FIG. 2 illustrates an example hybrid rendering graphics processing system 200. The graphics processing system 200 comprises memory $202_1$, $202_4$, geometry processing logic 204 and rasterization logic 206. The memories $202_1$, and $202_4$ may be implemented in the same physical unit of memory.

The geometry processing logic 204, like the geometry processing logic 104 of FIG. 1, implements the geometry processing phase. The geometry processing logic 204 comprises transformation logic 208 and a tiling engine 210. The transformation logic 208 operates in the same manner as the transformation logic 108 of FIG. 1. Specifically, the transformation logic 208 receives geometry data (e.g. vertices, primitives and/or patches) from an application (e.g. a game application) and transforms the geometry data into the rendering space (e.g. screen space). The transformation logic 208 may also perform functions such as clipping and culling to remove geometry data (e.g. primitives or patches) that falls outside of a viewing frustum, and/or apply lighting/attribute processing as is known to those of skill in the art.

The transformed geometry data (e.g. vertices, primitives and/or patches) is provided to the tiling engine 210.

The tiling engine 210 stores the transformed geometry data in a local transformed geometry buffer 211 and generates a list, for each tile, of the transformed primitives in the local transformed geometry buffer 211 that fall, at least partially within that tile. The list may be referred to as a partial display list. In some cases, the partial display list may comprise pointers or links to the transformed geometry data (e.g. vertex data) in the local transformed geometry buffer 211 related to the primitives that, at least partially, fall within the tile. The local transformed geometry buffer is not intended to be necessarily large enough to store all of the transformed geometry data to render a frame, so periodically (e.g. from time to time, e.g., at regular intervals, or when the local transformed geometry buffer 211 becomes full or when the fullness of the local transformed geometry buffer 211 is above a threshold) the tiling engine 210 sends one or more partial display lists to the rasterization logic 206 to thereby free up space in the local transformed geometry buffer 211. As described above, this means that when a partial display list is provided to the rasterization logic 206 it may only comprise a portion of the primitives that fall within that tile (because some primitives that fall within the tile might not have been processed yet by the geometry processing logic 204).

The rasterization logic 206 implements the rasterization phase. Specifically, the rasterization logic 206 renders the primitives in a tile-by-tile manner by fetching the transformed geometry data from the local transformed geometry buffer 211 for the primitives that fall within the tile as indicated by the partial display list for that tile; and rendering the primitives for that tile based on the transformed geometry data.

In some cases, the rasterization logic 206 may comprise a rasterizer 212, hidden surface removal (HSR) logic 214 and texturing/shading logic 216. In these cases, the rasterizer 212 receives partial display lists from the tiling engine 210 and for each partial display list fetches the transformed geometry data from the local transformed geometry buffer 211 for the primitives that fall within a tile as specified by the partial display list, and converts each primitive into a set of primitive fragments.

The primitive fragments for a particular tile are then provided to the HSR logic 214 which removes primitive fragments which are hidden (e.g. hidden by other primitive fragments). The remaining fragments (after hidden surface removal) are then passed to the texturing/shading logic 216 which performs texturing and/or shading on the primitive fragments to determine pixel values of a rendered image. The rendered pixel values for a tile can then be stored in memory 202$_4$ (e.g. frame buffer).

When the whole image has been rendered and stored in the memory 202$_4$ (e.g. frame buffer) the image can be output from the graphics processing system 200 and used in any suitable manner, for example, displayed on a display, stored in memory, or transmitted to another device, etc.

Although the geometry processing logic is shown in the figures as being separate to the rasterization logic, in some implementations the geometry processing logic and the rasterization logic may share some resources. For example, the graphics processing system could use a unified shading approach wherein the same physical execution units can be used to execute instructions for use in the geometry processing phase (e.g. to perform vertex processing) and to execute instructions for use in the rasterization phase (e.g. to perform fragment processing).

In such hybrid rendering systems it is desirable to be able to tile the primitives (i.e. sort the primitives into tiles) in an efficient manner while ensuring that the limited size of the local transformed geometry buffer 211 does not become a bottleneck.

Accordingly, described herein are methods and tiling engines for tiling primitives in a hierarchical manner which can be used in, but are not limited to use in, a hybrid rendering graphics processing system. Specifically, the tiling engines described herein comprise a chain of sorting units which sort the primitives into successively smaller regions of the rendering space using a set of queues. The chain of sorting units comprises a top level sorting unit followed by one or more lower level sorting units. The top level sorting unit sorts primitives into regions of the rendering space by storing information that identifies primitives that fall, at least partially, within a region in a queue associated with that region. The next sorting unit in the chain then sorts the primitives identified in each queue of the top level sorting unit into smaller regions of rendering space by storing information that identifies primitives that fall, at least partially, within a smaller region in a queue associated with that smaller region. This is repeated until the primitives have been sorted into tile-sized regions. The primitives identified in the queues associated with the tile-sized regions are then selectively output to the rasterization phase for rendering on a tile basis.

The described methods and tiling engines allow primitives to be sorted into tiles in an efficient manner that makes effective use of the small local transformed geometry buffer without requiring a large amount of memory to implement.

Figure 3:
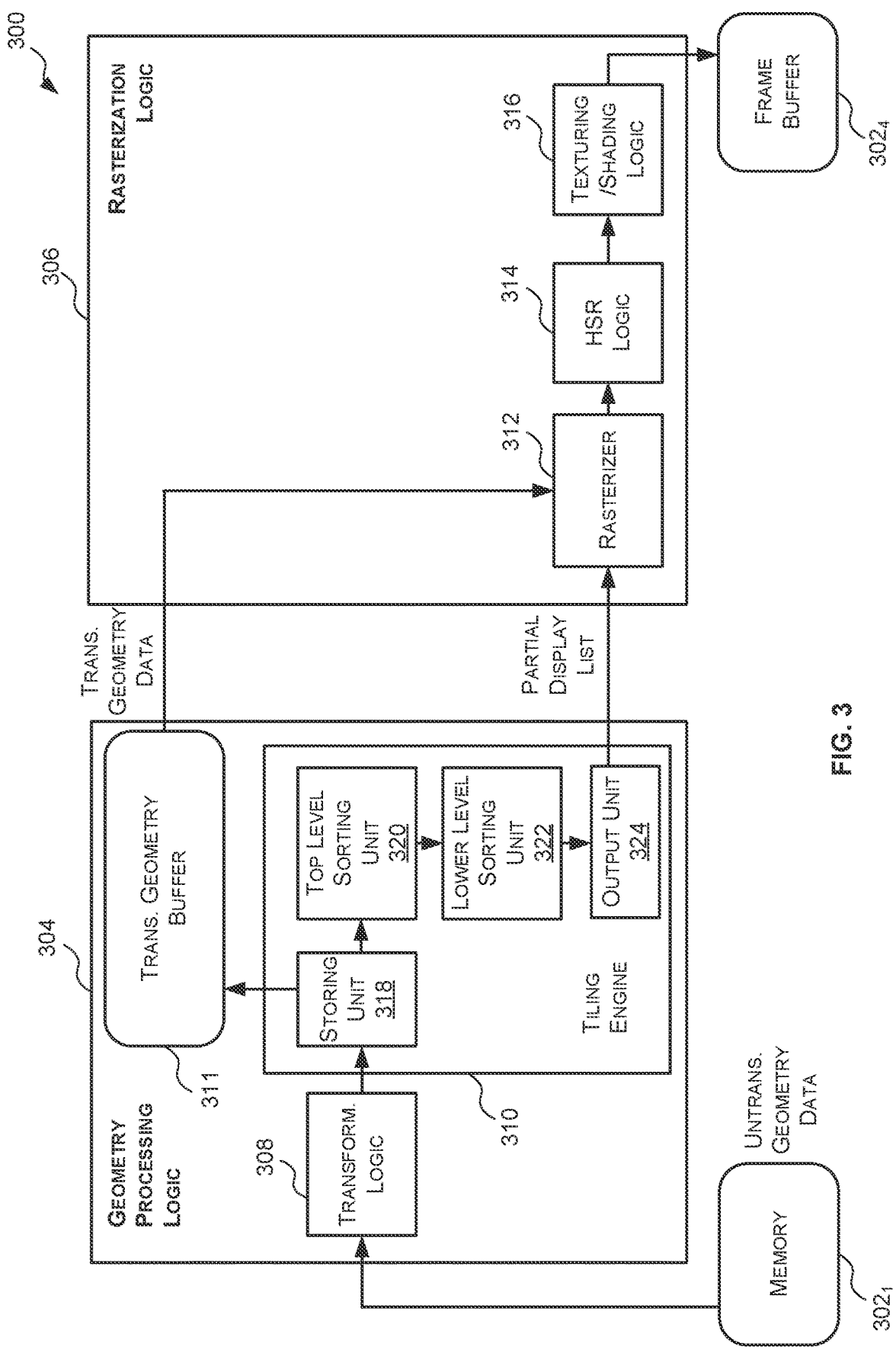
FIG. 3 is a block diagram of an example hybrid rendering graphics processing system with a hierarchical tiling engine.

Reference is now made to FIG. 3 which illustrates an example hybrid rendering graphics processing system 300 wherein the tiling engine is configured to implement hierarchical tiling. Specifically, the hybrid rendering graphics processing system 300 of FIG. 3 is the same as the hybrid rendering graphics processing system 200 of FIG. 2—it has memory 302$_1$, 302$_4$; geometry processing logic 304 that comprises transformation logic 308, a tiling engine 310 and a local transformed geometry buffer 311; and rasterization logic 306 that comprises a rasterizer 312, HSR logic 314 and texturing/shading logic 316 (which work in the same manner as the corresponding components in the system 200 described above with respect to FIG. 2)—except the tiling engine 310 is configured to implement hierarchical tiling. As described above, in hierarchical tiling the primitives are sorted into successively smaller regions of the rendering space. For example, the primitives may be first sorted into 128×128 regions and then the primitives associated with each 128×128 region may be sorted into 8×8 regions.

As described above, graphics processing systems are configured to receive graphics data, e.g. from an application (e.g. a game application) running on a computer system, and to generate a rendering output (e.g. an image) from the graphics data. The rendering space is a two-dimensional, often, but not necessarily, rectangular (where rectangle includes square) grid of pixels. A region of the rendering space is the portion of the rendering space corresponding to a set of pixels and may be defined by the number of pixels covered by the region. For example, an n×m region of the rendering space is a portion of the rendering space corresponding to an n×m set of pixels where n and m are integers. As described in more detail below, a region of the rendering space may be a portion of the rendering space corresponding to a contiguous block of pixels or a non-contiguous set of pixels.

The hierarchical tiling engine 310 of FIG. 3 comprises, a storing unit 318, a chain of sorting units 320, 322, and an output unit 324.

The storing unit 318 is configured to receive the transformed geometry data (e.g. transformed primitives) generated by the transformation logic 308 and store the received primitives in the local transformed geometry buffer 311. Specifically, the storing unit 318 is configured to, for each received primitive, determine if there is sufficient space in the local transformed geometry buffer 311 to store the received primitive. If the storing unit 318 determines that there is space in the local transformed geometry buffer 311 to store the primitive, then the storing unit 318 stores the primitive (e.g. the transformed geometry data related thereto) in the local transformed geometry buffer 311 and forwards the primitive (e.g. the transformed geometry data related thereto) to the chain of sorting units 320, 322 along with information indicating the location of the primitive in the local transformed geometry buffer 311. The information indicating the location of the primitive in the local transformed geometry buffer 311 may include, for example, an address of the local transformed geometry buffer 311 at which the primitive is stored. If, however, the storing unit 318 determines that there is not sufficient space in the local transformed geometry buffer, then the storing unit 318 may stall until there is sufficient space in the local transformed geometry buffer 311 to store the received primitive.

In some cases, the primitives (e.g. the transformed geometry data related thereto) may be stored in the local transformed geometry buffer 311 on a primitive basis. In these cases, the storing unit 318 may determine that there is sufficient space in the local transformed geometry buffer 311 if there is enough space in the buffer to store that primitive. In other cases, which are described in more detail below, the primitives (e.g. the transformed geometry data related thereto) may be stored in primitive blocks and the storing unit 318 may determine that there is sufficient space in the buffer to store the primitive if there is enough space in the buffer to store the entire primitive block to which the primitive belongs. In these cases, the information indicating the location of the primitive in the local transformed geometry buffer 311 may include an address of the local transformed geometry buffer 311 at which the primitive block is stored, and an index or offset indicating the location of the primitive within the primitive block.

The chain of sorting units 320, 322 are configured to hierarchically sort the primitives into tiles using a set of queues. Specifically, the chain of sorting units 320, 322 is configured to successively sort the primitives into smaller and smaller regions of the rendering space until the primitives are sorted into tiles. The chain of sorting units comprises a top level sorting unit 320 followed by one or more lower level sorting units 322. The top level sorting unit 320 sorts the primitives received from the storing unit 318 into regions of the rendering space by storing an identifier of any primitive that falls, at least partially, within a region in a queue associated with that region. Each lower level sorting unit 322 sorts the primitives in the queues of the preceding sorting unit in the chain into smaller regions (e.g. sub-regions) on a queue by queue basis by storing an identifier of any primitive in the queue of a preceding sorting unit that falls, at least partially, within a smaller region in a queue of the lower level sorting unit that is associated with the smaller region (e.g. sub-region).

The output unit 324 is configured to output the primitives in the queues of the last sorting unit in the chain on a queue by queue basis. Specifically, the output unit 324 is configured to select one or more queues of the last sorting unit to be processed by the rasterization logic and for each selected queue provide the primitives identified in that queue to the rasterization logic in order. The set of primitives identified in a queue of the last sorting unit that are output by the output unit 324 may be identified by a data structure referred to as a partial display list.

Figure 4:
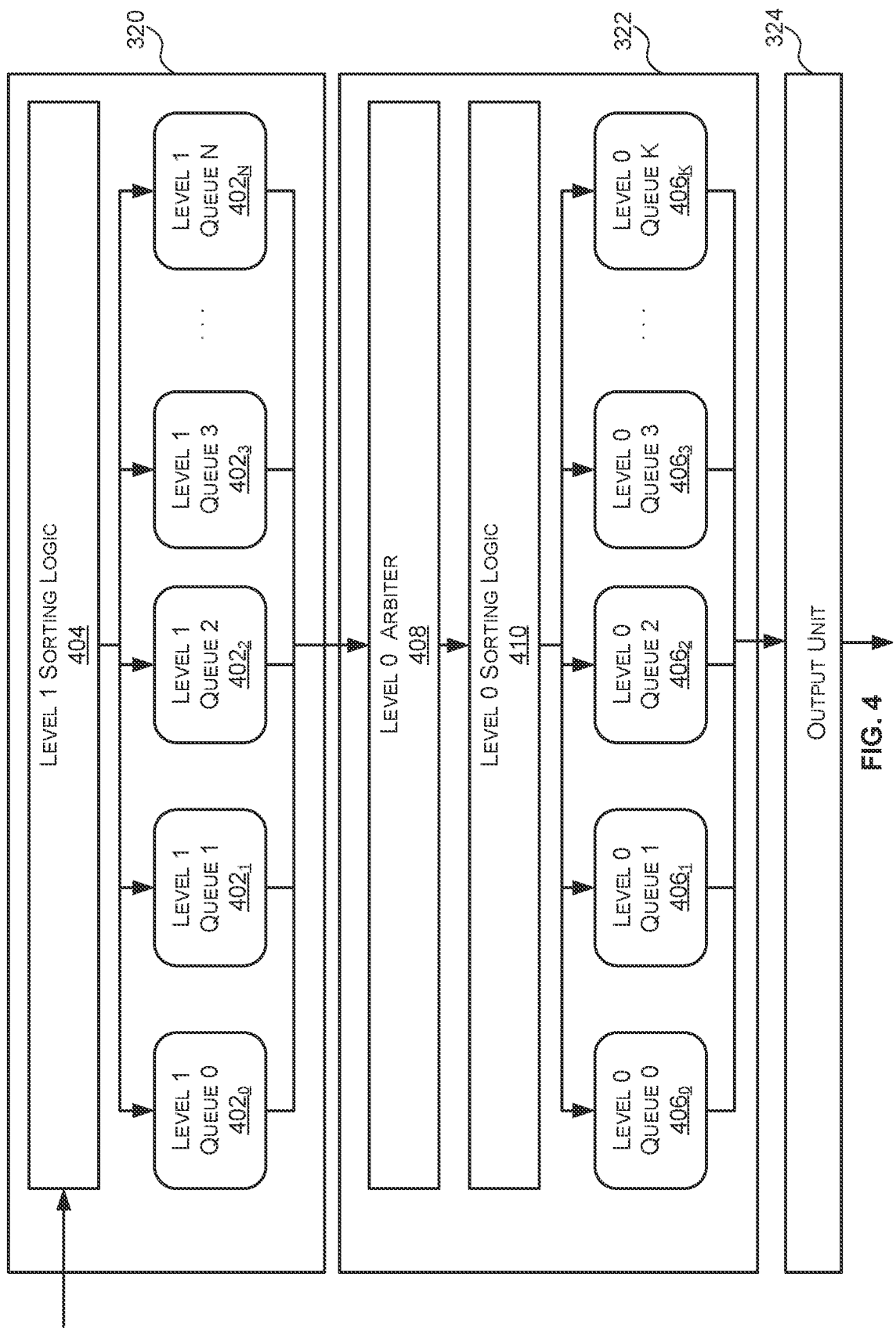
FIG. 4 is a block diagram of an example implementation of the hierarchical tiling engine of FIG. 3.

Reference is now made to FIG. 4 which illustrates an example implementation of the chain of sorting units 320, 322 and output unit 324 of FIG. 3 which are configured to hierarchically tile primitives using a set of queues. In this example the chain of sorting units comprise a top level sorting unit 320 followed by one lower level sorting unit 322.

The top level sorting unit 320 (which may be referred to as the level 1 sorting unit in this example) is configured to sort the primitives received from the storing unit 318 into a plurality of top level regions of the rendering space, wherein the plurality of top level regions cover the entire rendering space. For example, if the rendering space comprises a 1024×1024 array of pixels the rendering space may be divided into sixty-four 128×128 pixel regions. It will be evident to a person of skill in the art that this is an example only, and that in other examples the rendering space may be larger or smaller and there may be a different number of top level regions of the rendering space into which the primitives are sorted. In some cases, the top level sorting unit 320 may be configured to sort the primitives into top level regions that each cover one quarter of the rendering space (e.g. rendering target).

The top level sorting unit 320 may comprise a plurality of top level queues $402_0$, $402_1$, $402_2$, $402_3$ ... $402_N$ and top level sorting logic 404.

As is known to those of skill in the art, a queue is a structure which is configured to store elements in the order in which they are received. The top level queues $402_0$, $402_1$, $402_2$, $402_3$ ... $402_N$ of FIG. 4 are specifically configured to store primitive identifiers in the order in which they are received. In this example there are N top level queues wherein N is an integer greater than or equal to two. In many cases the primitives are output by an application in a predetermined order and it is important that the ordering of the primitives (within a tile) be maintained. In these cases, storing the primitive identifiers in the queues in the order in which they are received allows the ordering of the primitives within a region, and within a tile, to be maintained. The top level queues $402_0$, $402_1$, $402_2$, $402_3$ ... $402_N$ may have a fixed size which defines a maximum number of primitive identifiers that can be stored in a queue. The maximum number of primitive identifiers that can be stored may depend on the format of the primitive identifiers.

In some cases, the primitive identifier may be information indicating the location in the local transformed geometry buffer 311 where the transformed geometry data for that primitive is stored. For example, the primitive identifier may be an address (or an offset from which an address can be generated) within the local transformed geometry buffer 311 where the transformed geometry data related to the primitive is stored. Where each primitive is defined by one or more vertices, the transformed geometry data for a primitive may comprise the transformed position data for the vertices that form that primitive (e.g. X, Y and Z coordinates in rendering space which describe the position of the vertex). The transformed geometry data for a primitive may also comprise a set of attributes to describe the appearance of each vertex, such as texture coordinates (U, V) and/or a base colour to apply to the vertex.

The format of the primitive identifier may depend on how the transformed geometry data is stored in the local transformed geometry buffer 311. For example, as described in more detail below, the transformed geometry data may be stored on a primitive basis or in primitive blocks where the transformed geometry data for a set of primitives is stored together. Example formats for the primitive identifier are described below in the section entitled "Storing Unit and Local Transformed Geometry Buffer".

Figure 5:
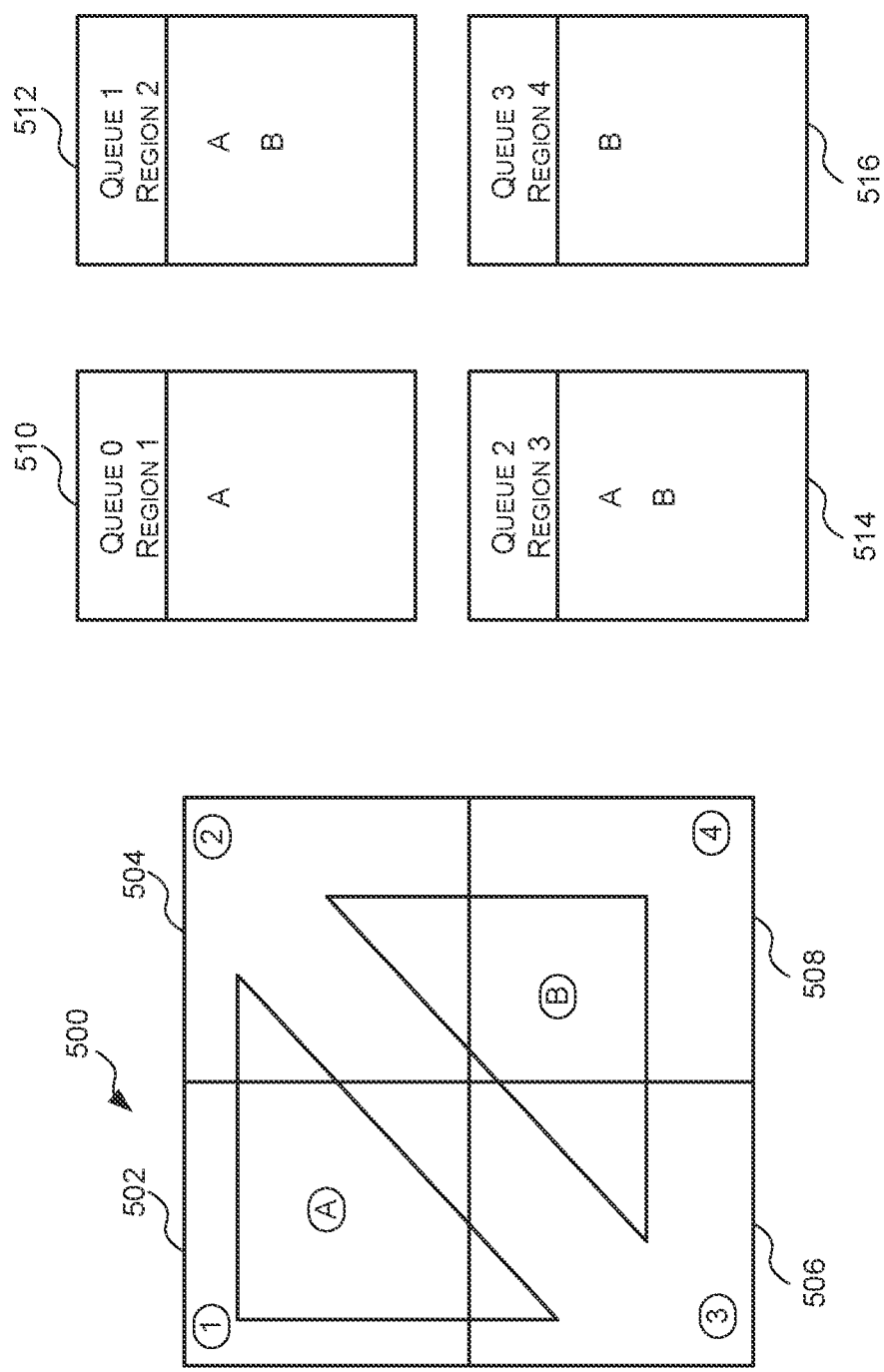
FIG. 5 is a schematic diagram illustrating sorting primitives into a plurality of regions of the rendering space.

The top level sorting logic 404 is configured to sort the primitives into the plurality of top level regions of the rendering space. Specifically, the top level sorting logic 404 is configured to determine, for each received primitive, which of the plurality of top level regions the primitive, at least partially, falls within; and if the top level sorting logic 404 determines that a primitive falls, at least partially, within a top level region, the top level sorting logic 404 adds the primitive's identifier to the queue associated with that top level region. As a primitive may fall, at least partially, within more than one top level region, a primitive's identifier may be added to more than one queue. For example, as shown in FIG. 5, if the rendering space 500 is divided into four top level regions 502, 504, 506, 508 and the top level sorting logic 404 determines that primitive A, at least partially, falls within each of the first three top level regions 502, 504, 506 then information identifying primitive A is added to the queues 510, 512, 514 associated with each of those top level regions. Similarly, if the top level sorting logic 404 determines that primitive B, at least partially, falls within each of the last three top level regions 504, 506, 508 then information identifying primitive B is added to the queues 512, 514, 516 associated with each of those top level regions.

The top level sorting logic 404 may use any suitable method for determining whether a primitive falls, at least partially, within a top level region. For example, in some cases the top level sorting logic 404 may use a simple, less accurate, method, such as a simple bounding box tiling method, to determine whether a primitive, at least partially, falls within a top level region so as to quickly sort the primitives into top level regions. As is known to those of skill in the art, in a bounding box method a bounding box that encompasses the primitive is identified (e.g. the smallest axis-aligned bounding box that encompasses the vertices of the primitive). The bounding box may be generated using any suitable method. For example, the top level sorting logic 404 may generate a bounding box by finding the minimum and maximum X and Y coordinates of the vertices of the primitive and forming an axis-aligned bounding box from those coordinates. The bounding box may be generated at any granularity or resolution. For example, in some cases, the bounding box may be at the X and Y coordinate resolution (i.e. the bounding box may be defined by the maximum and minimum X and Y coordinates of the vertices). In other cases, the bounding box may be at the top level region resolution (i.e. the smallest top level region edges that encompass the primitive). Once the top level sorting logic 404 has identified a bounding box for a primitive, the top level sorting logic 404 may determine that the primitive, at least partially, falls within a top level region if the bounding box at least partially overlaps with the top level region. In other words, a primitive may be determined to, at least partially, fall within a top level region if the bounding box for that primitive, at least partially, falls within the bounds of the top level region. While a bounding box method can be used to quickly and efficiently determine whether a primitive, at least partially, falls within a top level region, it is not 'perfect' tiling as the bounding box is often larger than the primitive which may result in a primitive being determined to be in a top level region when in fact it is not in the top level region.

Figure 6:
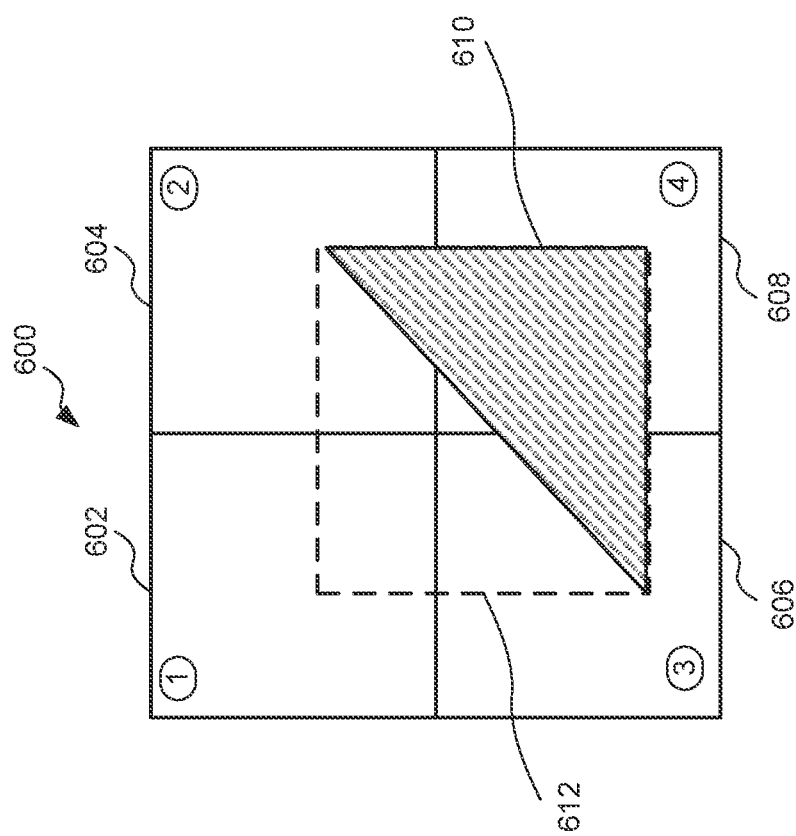
FIG. 6 is a schematic diagram illustrating an example bounding box method of determining whether a primitive, at least partially, falls within a region of the rendering space.

For example, FIG. 6 shows an example rendering space 600 that has been subdivided into four equal top level regions 602, 604, 606, 608. If a simple axis-aligned bounding box method is used to determine which top level regions 602, 604, 606, 608 a primitive 610, at least partially, falls within, then a bounding box 612 around the primitive 610 is generated. Since the bounding box 612 at least partially overlaps with all of the regions 602, 604, 606, 608 it may be determined that the primitive 610 falls, at least partially, within each of the four top level regions even though it actually only falls within or overlaps with three of the top level regions 604, 606, 608. However, determining that a primitive falls within a top level region when it does not actually fall within the region will not cause an error and the primitive will simply be discarded in the rasterization phase. However, determining that a primitive does not fall within a top level region that it does fall within may cause an error in the rendering phase. Accordingly, it is advantageous for the tiling to be conservative. In other words, it is better to indicate a primitive falls within a region even though the primitive does not actually fall within the region than to not include a primitive that actually does fall within the region.

In other cases, however, the top level sorting logic 404 may use a more complicated and/or more accurate method, such as a perfect tiling or near perfect tiling method, to determine whether a primitive falls within a top level region. An example perfect tiling method, which may be used by the top level sorting logic 404, is described in the Applicant's Published GB Patent Application No. 2549789 which is herein incorporated in its entirety.

In some cases, the size and the number of the top level regions may be predetermined. In these cases, each top level queue $402_0, 402_1, 402_2, 402_3 \ldots 402_N$ may be pre-allocated to, or pre-associated with, a specific top-level region. For example, if the top level sorting unit 320 is configured to sort primitives of a 1024×1024 rendering space into 128×128 top-level regions, a first queue $402_0$ may be pre-allocated to the 128×128 region that spans X co-ordinates 0 to 127 and Y co-ordinates 0 to 127, a second queue $402_1$ may be pre-allocated to the 128×128 region that spans X co-ordinates 128 to 255 and Y co-ordinates 0 to 127, a third queue $402_2$ may be pre-allocated to the 128×128 region that spans X-coordinates 0 to 127 and Y co-ordinates 128 to 255, and a further queue $402_3$ may be pre-allocated to the 128×128 region that spans X co-ordinates 128 to 255 and Y co-ordinates 128 to 255 and so on.

In other cases, the size and/or number of the top-level regions may be configurable. For example, the tiling engine may support a plurality of different sized top-level regions and/or a plurality of different numbers of top-level regions. In these cases, the top level queues $402_0, 402_1, 402_2, 402_3 \ldots 402_N$ may be dynamically allocated to specific top-level regions. For example, in some cases, the top level sorting logic 404 may be configured to, if it determines that a primitive falls within a specific top-level region, determine if there is a queue allocated to that top level region. If there is a queue allocated to/associated with that top level region, then the top level sorting logic 404 may determine whether that queue is full. If the queue is not full the top level sorting logic 404 may add an identifier for that primitive to that queue. If the queue is full (e.g. the queue comprises the maximum number of primitive identifiers) then the top level sorting logic 404 may stall until the queue is not full. If, however, there is not a queue allocated to/associated with that region then the top level sorting logic 404 may select one of the free top level queues $402_0$, $402_1$, $402_2$, $402_3$ ... $402_N$ and allocate or associate that queue with that top level region. The top level sorting logic 404 may then add an identifier for that primitive to the queue allocated to that top level region.

Independent of whether the number and/or size of the top level regions is configurable it is desirable that there are enough queues in the top level sorting unit 320 so that each top level region can be allocated/associated with a queue at the same time. For example, if the maximum number of top level regions is sixty-four then preferably there are at least sixty-four queues (e.g. N=64).

The lower level sorting unit 322 (which may be referred to as the level 0 sorting unit in this example) is configured to sort the primitives in the queues of the top level sorting unit into smaller lower-level regions (e.g. sub-regions) on a queue by queue basis. For example, if the top level sorting unit 320 is configured to sort the primitives into 128×128 top level regions of the rendering space, the lower level sorting unit 322 may be configured to sort the primitives associated with each 128×128 top level region into 32×32 sub-regions thereof. The lower level sorting unit 322 may comprise a plurality of lower level queues $406_0$, $406_1$, $406_2$, $406_3$ ... $406_K$, an arbiter 408, and lower level sorting logic 410.

The lower level queues $406_0$, $406_1$, $406_2$, $406_3$ ... $406_K$, like the top level queues, are configured to store primitive identifiers in the order in which they are received. In this example there are K queues, wherein K is an integer greater than or equal to two. The number of top level queues may be the same as the number of lower level queues, or the number of top level queues may be different than the number of lower level queues. In some cases, there may be more lower level queues than top level queues as there are more lower level regions than top level regions. In some cases, the lower level queues $406_0$, $406_1$, $406_2$, $406_3$ ... $406_K$ may have a fixed size which defines a maximum number of primitive identifiers that can be stored in a lower level queue. The maximum number of primitive identifiers that can be stored in a lower level queue may depend on the format of the primitive identifiers. The size of the lower level queues may be the same as, or different than, the size of the top level queues. In some cases, the top level queues may be larger than the lower level queues as there will be more primitives that will fall within a top level region than a lower level sub-region. In other cases, the size of the lower level queues $406_0$, $406_1$, $406_2$, $406_3$ ... $406_K$ may not be fixed and may be dynamically adjusted to meet the current demand.

The lower level sorting unit 322 is not designed to necessarily process all of the top level queues at the same time. In some cases, the lower level sorting unit 322 may be able to process only a single top level queue at a time. In other cases, the lower level sorting unit 322 may be able to process multiple top level queues at the same time. Accordingly, the arbiter 408 is configured to select the next top level queue $402_0$, $402_1$, $402_2$, $402_3$ ... $402_N$ to be processed by the lower level sorting unit 322. The arbiter 408 may be configured to select the next top level queue to be processed based on any suitable criteria. For example, the arbiter 408 may be configured to select the longest queue (e.g. the queue with the most primitive identifiers); the newest queue (e.g. the queue which was most recently allocated to a region); the queue associated with the region that is closest (e.g. distance wise) to the region associated with the most recently processed queue; or the oldest queue (e.g. the queue which has been allocated to/associated with the current region the longest). Testing has shown that in some cases, selecting the oldest queue may work the best, in terms of freeing up space in the local transformed geometry buffer 311 faster. It will be evident to a person of skill in the art that these are examples only, and that any suitable criteria may be used by the arbiter 408 to select which top level queue is to be processed next.

The lower level sorting logic 410 is configured to sort the primitives identified in each selected top level queue into smaller regions (e.g. sub-regions or lower-level regions). For example, if the top level sorting unit 320 is configured to sort the primitives into 128×128 top level regions then the lower level sorting logic 410 may be configured to divide the 128×128 top level region of the selected queue into 32×32 sub-regions or lower level regions and sort the primitives identified in the selected queue into the 32×32 sub-regions. Where the lower level sorting unit 322 is the lowest level sorting unit, or the last sorting unit in the chain (as in the example shown in FIG. 4) the sub-regions or the lower level regions may be the size of a tile. For example, if the objective is to sort primitives into 32×32 tiles then the sub-regions may be 32×32 regions.

The lower level sorting logic 410 may be configured to sort the primitives identified in a selected top level queue into smaller regions (e.g. sub-regions or lower level regions) by, for each primitive identified in the selected queue: determining which of the plurality of smaller regions (e.g. sub-regions or lower level regions) the primitive, at least partially, falls within; for each sub-region or lower level region that the primitive falls within, adding an identifier of the primitive to a queue associated with that sub-region; and removing the primitive's identifier from the selected top level queue.

Figure 7:
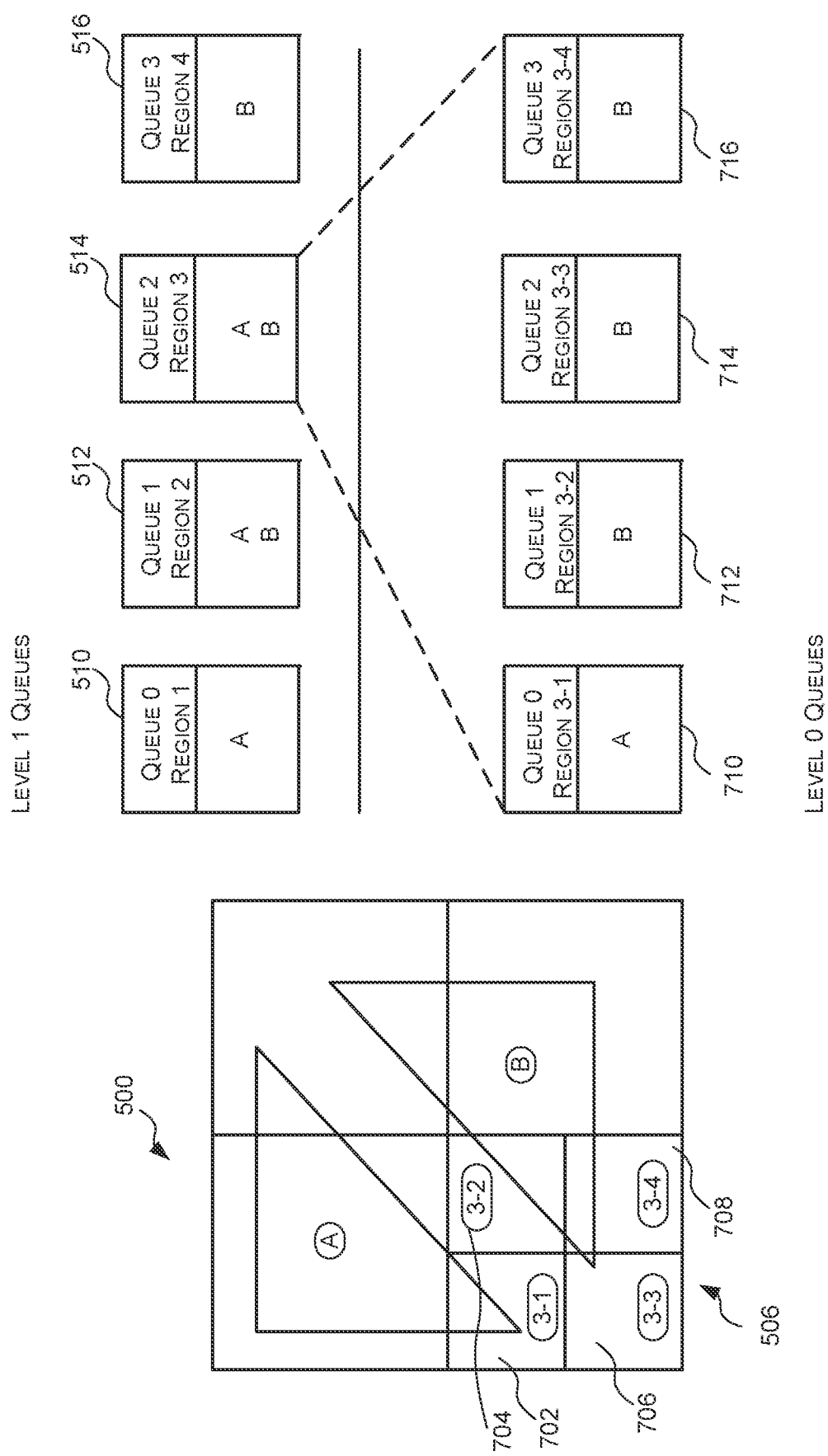
FIG. 7 is a schematic diagram illustrating sorting primitives identified in a queue associated with a region of the rendering space into sub-regions.

For example, as shown in FIG. 7, if the level 0 queue 514 associated with the third top level region 506 of FIG. 5 is selected by the arbiter 408 as the next queue to be processed by the lower level sorting logic 410, and the lower level sorting logic 410 is configured to sort the primitives identified in a selected top level queue into four sub-regions 702, 704, 706, 708, then the lower level sorting logic 410 may be configured to first determine which sub-regions 702, 704, 706, 708 the first primitive, primitive A, falls, at least partially, within. If the lower level sorting logic 410 determines that primitive A falls, at least partially, within the first sub-region 702 then the lower level sorting logic 410 may be configured to add an identifier for primitive A in the lower level queue 710 associated with the first sub-region 702 and remove the identifier for primitive A from the top level queue 514. The lower level sorting logic 410 may be configured to then determine which sub-regions 702, 704, 706, 708 the next primitive, primitive B, falls, at least partially, within. If the lower level sorting logic 410 determines that primitive B falls, at least partially, within the last three sub-regions 704, 706, 708 then the lower level sorting logic 410 may be configured to add an identifier for primitive B to the lower level queue 712, 714, 716 associated with each of those sub-regions 704, 706, 708. The lower level sorting logic 410 may then be configured to remove primitive B's identifier from the top level queue 514.

The lower level sorting logic 410 may be configured to determine that a primitive falls, at least partially, within a sub-region using any suitable method. For example, the lower level sorting logic 410 may use a bounding box method, a near perfect method or a perfect method, as described above, to determine whether a primitive falls, at least partially, within a sub-region. In some cases, the lower level sorting logic 410 may use a more precise or more accurate method of determining whether a primitive falls within a sub-region or lower level region than the top level sorting logic 404. For example, in some cases, the top level sorting logic 404 may be configured to use a bounding box method to determine whether a primitive, at least partially, falls within a top level region; and the lower level sorting logic 410 may be configured to use a near perfect or perfect tiling method to determine whether a primitive, at least partially, falls within a sub-region or lower level region.

As the primitive identifiers stored in the queue merely identify a particular primitive, the lower level sorting logic 410 and/or the arbiter 408 may be configured to, prior to the lower level sorting logic 410 processing a primitive identified in a top level queue, obtain the primitive (e.g. the transformed geometry related thereto) from the local transformed geometry buffer 311 based on the primitive identifier. The lower level sorting logic 410 may then be configured to determine whether a primitive falls, at least partially, within a sub-region based on the transformed geometry data related thereto.

In some cases, once the lower level sorting logic 410 has begun processing a top level queue, the top level sorting logic 404 may not be able to add any more primitive identifiers for the associated top level region to that top level queue. In these cases, after the lower level sorting logic 410 has begun processing a queue associated with a particular top level region the top level sorting logic 404 may stall if it receives a primitive that falls within that top level region. However, in other cases, the top level sorting logic 404 may continue to add primitive identifiers to a top level queue associated with a top level region up until that queue is no longer associated with that region.

Once the lower level sorting logic 410 has sorted all of the primitives identified in a selected queue (e.g. the top level queue is empty) the lower level sorting logic 410 may notify the arbiter 408 that it is now ready to process another top level queue. The arbiter 408 may then select the next top level queue for processing (as set out above) and provide information to the lower level sorting logic 410 indicating the next top level queue to process.

The lower level sorting unit 322 is not designed to necessarily have enough queues for each possible sub-region or lower level region in the rendering space to have a dedicated queue. For example, if the rendering space is a 1024×1024 pixel region, and the lower level sorting unit 322 is configured to sort primitives identified in each queue of the preceding sorting unit in the chain into 32×32 sub-regions or lower level regions, there will be one thousand twenty-four 32×32 sub-regions or lower level regions in the rendering space, but the lower level sorting unit 322 may not have one thousand twenty-four queues (i.e. K<1,024). Preferably, the lower level sorting unit 322 has at least enough queues so that each sub-region or lower level region of a top level region can be associated with a different queue at the same time. For example, if the top level sorting unit 320 is configured to sort primitives into 128×128 top level regions and the lower level sorting unit 322 is configured to sort the primitives identified as being associated with each 128×128 top level region into 32×32 sub-regions or lower level regions then there will be sixteen 32×32 sub-regions for each 128×128 top level region. Accordingly, in this example, preferably, the lower level sorting unit 322 has at least sixteen queues, however, the lower level sorting unit 322 may have more than sixteen queues. In some cases, the lower level sorting unit 322 may have 2× the minimum number of queues (e.g. at least thirty-two queues in the example above).

Where the lower level sorting unit 322 does not have enough queues for each possible sub-region or lower level region in the rendering space to have a dedicated queue, the lower level sorting logic 410 may be configured to dynamically allocate the queues of the lower level sorting unit 322 to the sub-regions as it is processes the queues of the top level sorting unit 320. For example, in some cases, the lower level sorting logic 410 may be configured to, before it starts processing a top level queue associated with a region, determine if there are enough free lower level queues for each sub-region. For example, if the top level queue relates to a 128×128 top level region and the lower level sorting logic 410 is configured to sort the primitives identified as falling within that region into 32×32 sub-regions then the lower level sorting logic 410 may be configured to determine if there are sixteen free lower level queues. If the lower level sorting logic 410 determines that there are the desired number of free lower level queues, then the lower level sorting logic 410 may allocate one of the free lower level queues to each of the sub-regions of the top level region. If, however, the lower level sorting logic 410 determines that there are not the desired number of free lower level queues then the lower level sorting logic 410 may stall until the desired number of lower level queues are free. However, this method of allocating queues means that the lower level sorting logic 410 may stall waiting for the desired number of lower level queues even though the lower level sorting logic 410 may not need all of those lower level queues. For example, in some cases although there may be sixteen sub-regions of a top level region, the primitives identified in the queue of the preceding sorting unit may actually only fall within four of those sub-regions.

Accordingly, in other cases, the lower level sorting logic 410 may be configured to, when it determines that a primitive falls within a sub-region, determine if a lower level queue has been allocated to/associated with that sub-region. If it is determined that a lower level queue has been allocated to that sub-region, then the lower level sorting logic 410 may determine whether that lower level queue is full (e.g. whether it contains the maximum number of primitive identifiers). If the queue is full then the lower level sorting logic 410 may stall until the queue is not full. If the queue is not full then the primitive's identifier is added to that queue. If, however, it is determined that a lower level queue has not been allocated to/associated with that sub-region, then the lower level sorting logic 410 may determine if there is a free lower level queue. If the lower level sorting logic 410 determines there is a free lower level queue, then the lower level sorting logic 410 may allocate that free lower level queue to the sub-region and add an identifier for the primitive to that lower level queue. If, however, the lower level sorting logic 410 determines that there is not a free lower level queue, then the lower level sorting logic 410 may stall until there is a free lower level queue. In this method the lower level sorting logic 410 may only have to stall until a single queue is freed up instead of waiting until a plurality of queues are freed up.

The output unit 324 is configured to output the primitives identified in the queues of the last sorting unit in the chain on a queue by queue basis to the rasterization logic. Specifically, the output unit 324 is configured to, when the rasterization logic is ready to receive the primitives associated with a new tile, select one of the lower level queues to output, and then output the primitives identified in the selected lower level queue to the rasterization logic in order. Once a primitive has been output to the rasterization logic that primitive's identifier may be removed from the lower level queue. Once all the primitives in the selected lower level queue have been output (and removed from the queue)

the lower level queue will be empty. At this point the lower level queue may be deallocated from the lower level region and may become a free lower level queue. The set of primitives identified in a lower level queue may be described herein as forming a partial display list.

The output unit 324 may be configured to select the next lower level queue to output to the rasterization logic in any suitable manner. For example, the output unit 324 may be configured to use one of the methods described with respect to the arbiter 408 to select the next lower level queue to process. For example, the output unit 324 may be configured to select the longest lower level queue (e.g. the lower level queue with the most primitive identifiers); the newest lower level queue (e.g. the lower level queue which was most recently allocated to a lower level region); the lower level queue associated with the lower level region that is closest (e.g. distance wise) to the lower level region associated with the most recently processed lower level queue; or the oldest lower level queue (e.g. the lower level queue which has been allocated to/associated with its lower level region the longest). In some cases, the output unit 324 may be configured to use a different method to select a lower level queue to output than the method used by the arbiter 408 to select the next top level queue to process.

In some cases, the output unit 324 may be configured to, for each primitive identified in a selected lower level queue, output information to the rasterization logic that identifies that primitive and the rasterization logic may be configured to retrieve the transformed geometry data that corresponds to that primitive from the local transformed geometry buffer 311. In other cases, the output unit may be configured to, for each primitive identified in a lower level queue, retrieve the transformed geometry data that corresponds to that primitive from the local transformed geometry buffer 311 and output the retrieved transformed geometry data to the rasterization logic.

In some cases, once the output unit 324 has begun processing a lower level queue, the lower level sorting logic 410 may not be able to add any more primitive identifiers for the associated lower level region to that lower level queue. In these cases, after the output unit 324 has begun processing a queue associated with a particular lower level region the lower level sorting logic 410 may stall if it receives a primitive that falls within that lower level region. However, in other cases, the lower level sorting logic 410 may continue to add primitive identifiers to a queue associated with a lower level region up until that queue is no longer associated with that lower level region.

In some cases, a queue may only be allocated to one region at a time. In these cases a queue may only be deemed a 'free' queue if that queue is not associated with a region—this may be because the queue has never been allocated to a region, or because the queue was allocated to a region, but after the lower level sorting logic 410 or the output unit 324 has processed that queue it has been de-allocated from that region.

While in the example illustrated in FIG. 4 the chain of sorting units comprises a single lower level sorting unit 322, other tiling engines may have more than one lower level sorting unit. For example, in some cases, there may be three lower level sorting units which sort the primitives into successively smaller regions. In some cases, the number of lower level sorting units 322 may be configurable or dynamically selectable. For example, the number of lower level sorting units 322 may be configured by a driver at the start of a render based on, for example, the size of the rendering space (e.g. render target).

Where there are multiple lower level sorting units, each lower level sorting unit may operate in the same manner as the lower level sorting unit 322 of FIG. 4 by sorting the primitives identified in the queues of the preceding sorting unit in the chain into smaller regions on a queue by queue basis. Specifically, each lower level sorting unit is configured to select queues of the preceding sorting unit in the chain to process. As described above, any suitable method may be used to select the queues of the preceding sorting unit to process. For each selected queue, the lower level sorting unit determines which sub-regions the primitives identified in the selected queue, at least partially, fall within. Then, for each sub-region a primitive, at least partially, falls within, the lower level sorting unit adds an identifier of that primitive to a queue associated with that sub-region. As described above, the queues may be dynamically allocated to the sub-regions using any suitable method.

Figure 8:
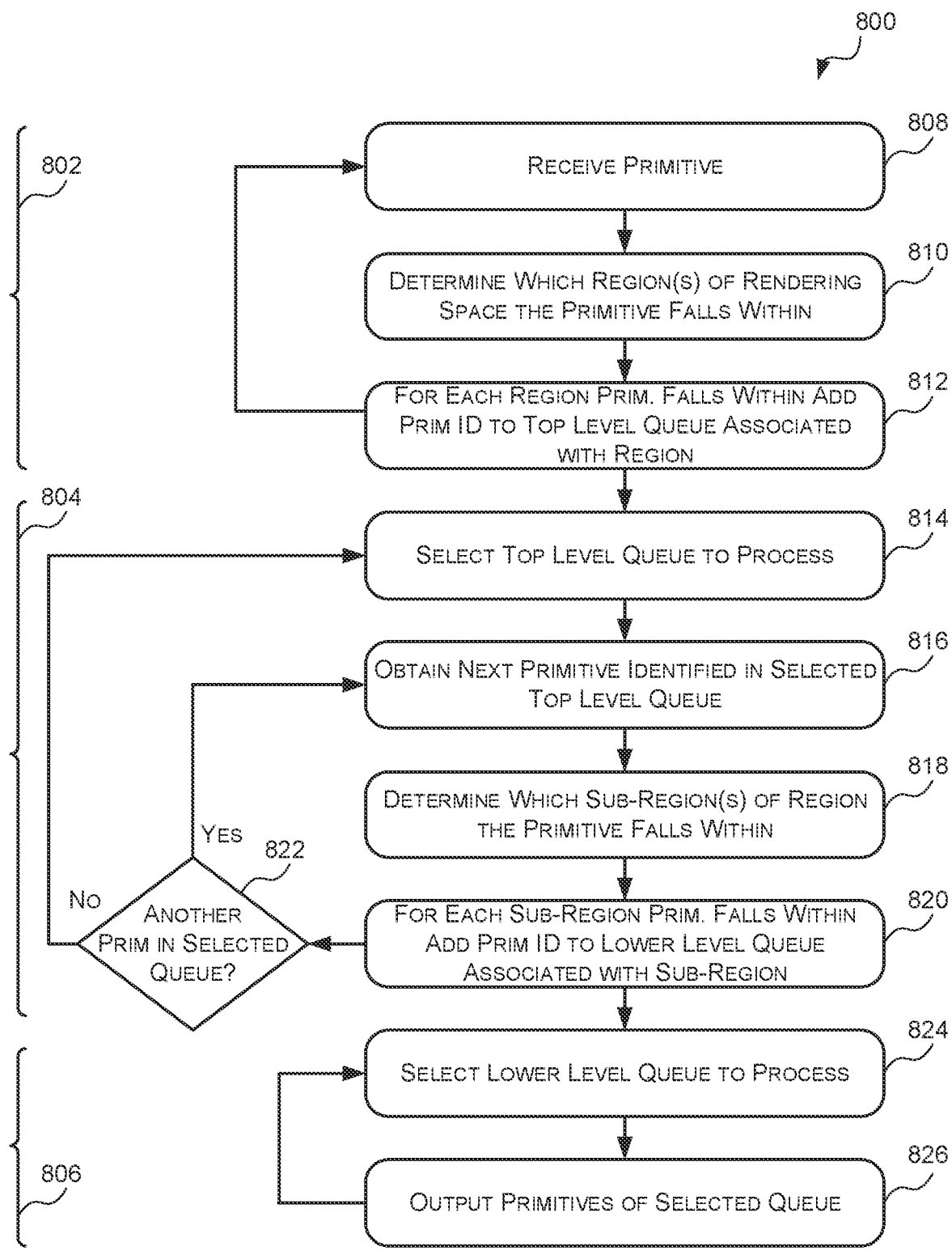
FIG. 8 is a flow diagram of an example method for hierarchically tiling primitives.

Reference is now made to FIG. 8 which illustrates an example method 800 of hierarchically sorting primitives into tiles using a plurality of queues which may be implemented by the tiling engine of FIG. 3. The method 800 can be divided into a top level sorting phase 802, a lower level sorting phase 804 and an output phase 806. The method 800 begins in the top level sorting phase 802 at block 808 where the tiling engine (e.g. hierarchical tiling engine 310) receives a primitive for tiling. Receiving a primitive may comprise receiving the transformed geometry data (e.g. transformed vertex data) related to that primitive. Once a primitive has been received at the tiling engine (e.g. hierarchical tiling engine 310) the method proceeds to block 810.

At block 810, the tiling engine (e.g. the top level sorting unit 320) determines which of a plurality of top level regions of the rendering space the received primitive, at least partially, falls within. As described above, together the plurality of top level regions cover the entire rendering space. For example, if the rendering space is 1024×1024 pixels the top level regions may comprise sixteen non-overlapping 256× 256 regions. As described above, the tiling engine (e.g. the top level sorting unit 320) may be configured to determine whether a primitive, at least partially, falls within a top level region using any suitable manner. For example, the tiling engine (e.g. the top level sorting unit 320) may determine whether a primitive, at least partially, falls within a top level region using a bounding box tiling method, a near-perfect tiling method or a perfect tiling method. Once the tiling engine (e.g. the top level sorting unit 320) has determined which top level regions the received primitive, at least partially, falls within, the method 800 proceeds to block 812.

At block 812, for each top level region the primitive, at least partially, falls within, the tiling engine (e.g. the top level sorting unit 320) adds an identifier of the primitive to a top level queue associated with that top level region. For example, if it is determined at block 810 that the received primitive, at least partially, falls within three different top level regions, then an identifier of the primitive is added to a first queue that is associated with the first top level region, a second queue that is associated with the second top level region, and a third queue that is associated with the third top level region. As described above, in some cases, the primitive (e.g. the transformed geometry data related thereto) may be stored in the local transformed geometry buffer 311 and the identifier of a primitive may comprise information identifying the location of the primitive (e.g. the transformed geometry data related thereto) in the local transformed geometry buffer 311. Once an identifier of the primitive has been added to a top level queue associated with each of the top level regions the primitive, at least partially, falls within, the method 800 proceeds (i) back to block 808 where the next primitive is received and sorted into the regions; and (ii) to the lower level sorting phase 804.

The lower level sorting phase 804 starts at block 814 where the tiling engine (e.g. lower level sorting unit 322) selects one of the top level queues to process. As described above, the tiling engine (e.g. lower level sorting unit 322) may be configured to select one of the top level queues to process using any suitable criteria. For example, as described above, the tiling engine (e.g. lower level sorting unit 322) may be configured to select the longest queue (e.g. the queue with the most primitive identifiers); the newest queue (e.g. the queue which was most recently allocated to/associated with a top level region); the queue associated with the top level region that is closest (e.g. distance wise) to the top level region associated with the most recently processed queue; or the oldest queue (e.g. the queue which has been allocated to/associated with its top level region for the longest period of time). Once a top level queue has been selected for processing in the lower level sorting phase, the method 800 proceeds to block 816.

At block 816, the tiling engine (e.g. the lower level sorting unit 322) obtains the first (e.g. top) primitive identified in the selected top level queue for processing. Where the primitives (e.g. the transformed geometry data related thereto) are stored in the local transformed geometry buffer 311, obtaining the first primitive identified in the selected top level queue may comprise obtaining the first identified primitive (e.g. the transformed geometry data related thereto) from the local transformed geometry buffer 311. At this point the tiling engine (e.g. lower level sorting unit 322) may also remove the identifier for that primitive from the selected top level queue. Once the first primitive identified in the selected top level queue has been obtained the method 800 proceeds to block 818.

At block 818, the tiling engine (e.g. the lower level sorting unit 322) subdivides the top level region associated with the selected top level queue into a plurality of smaller sub-regions and determines which sub-regions the received primitive, at least partially, falls within. For example, if the selected top level queue is associated with a 256×256 top level region, that 256×256 region may be divided into sixty-four 32×32 sub-regions and the tiling engine (e.g. the lower level sorting unit 322) may determine whether the primitive falls, at least partially, within each of those sixty-four 32×32 sub-regions. As described above, the tiling engine (e.g. the lower level sorting unit 322) may be configured to determine whether a primitive, at least partially, falls within a sub-region using any suitable tiling method. For example, the tiling engine (e.g. the lower level sorting unit 322) may determine whether a primitive falls within a sub-region using a bounding box tiling method, a near-perfect tiling method, a perfect tiling method or any other suitable tiling method. In some cases, the tiling engine (e.g. the lower level sorting unit 322) may be configured to use a more precise tiling method for determining whether a primitive, at least partially, falls within a sub-region than the tiling method used at block 810 for determining whether a primitive, at least partially, falls within a top level region. For example, in some cases, at block 810 the tiling engine may use a bounding-box method to determine whether a primitive, at least partially, falls within a top level region and may use a near perfect or a perfect tiling method to determine whether a primitive, at least partially, falls within a sub-region. Once the tiling engine (e.g. the top level sorting unit 320) has determined which sub-regions the received primitive, at least partially, falls within, the method 800 proceeds to block 820.

At block 820, for each sub-region the primitive, at least partially, falls within, the tiling engine (e.g. the lower level sorting unit 322) adds an identifier of the primitive to a lower level queue associated with that sub-region. For example, if it is determined at block 818 that the primitive falls, at least partially, within two different sub-regions, then an identifier of the primitive is added to a first lower level queue that is associated with the first sub-region, and an identifier of the primitive is added to a second lower level queue that is associated with the second sub-region. As described above, in some cases, the primitive (e.g. the transformed geometry data related thereto) may be stored in the local transformed geometry buffer 311 and the identifier of a primitive may comprise information identifying the location of the primitive (e.g. the transformed geometry data related thereto) in the local transformed geometry buffer 311. Once an identifier of the primitive has been added to a lower level queue associated with each of the sub-regions the primitive, at least partially, falls within, the method 800 proceeds to (i) block 822; and (ii) the output phase 806.

At block 822, the tiling engine (e.g. the lower level sorting unit 322) determines whether there are any other primitive identifiers in the selected top level queue. If it is determined that there is at least one primitive identifier in the selected top level queue, then the method 800 proceeds back to block 816 where the next primitive (e.g. the transformed geometry data related thereto) is obtained and the primitive is sorted into sub-regions. If, however, it is determined that there are no more primitive identifiers in the selected top level queue (e.g. the selected top level queue is empty and thus becomes a free queue) then the method 800 proceeds back to block 814 where the tiling engine (e.g. the lower level sorting unit 322) selects another top level queue to be processed and then the primitives identified in the selected queue are obtained and sorted into sub-regions.

The output phase 806 starts at block 824 where the tiling engine (e.g. the output unit 324) selects one of the lower level queues for processing in the output phase. As described above, the tiling engine (e.g. output unit 324) may be configured to select one of the lower level queues to process using any suitable criteria. For example, as described above, the tiling engine (e.g. output unit 324) may be configured to select the longest queue (e.g. the queue with the most primitive identifiers); the newest queue (e.g. the queue which was most recently allocated to/associated with a lower level region); the queue associated with the lower level region that is closest (e.g. distance wise) to the lower level region associated with the most recently processed lower level queue; or the oldest queue (e.g. the queue which has been allocated to/associated with its lower level region for the longest period of time). Once a lower level queue has been selected for processing in the output phase the method 800 proceeds to block 826.

At block 826, the primitives identified in the selected lower level queue are output in order. In some cases, outputting a primitive identified in the selected lower level queue may comprise outputting the primitive identifier. In other cases, outputting a primitive identified in the selected lower level queue may comprise obtaining the primitive (e.g. the transformed geometry data related thereto) from the local transformed geometry buffer 311 and outputting the primitive (e.g. the transformed geometry data related thereto). In some cases, the primitives identified in the selected lower level queue are output to the rasterization phase of a graphics processing system for processing.

Although in the example method 800 of FIG. 8 there is a single lower level processing phase, in other examples there may be multiple lower level processing phases. In each lower level processing phase, blocks 814 to 822 are executed to sort the primitives identified in the queues of the preceding sorting phase in the chain into smaller sub-regions. For example, where there are two lower level sorting phases, the top level sorting phase may sort the primitives into 256×256 top level regions, the first lower level sorting phase may sort the primitives in each 256×256 top level region into 64×64 sub-regions, and the second lower level sorting phase may sort the primitives in each 64×64 sub-region into 16×16 sub-regions thereof.

Figure 9:
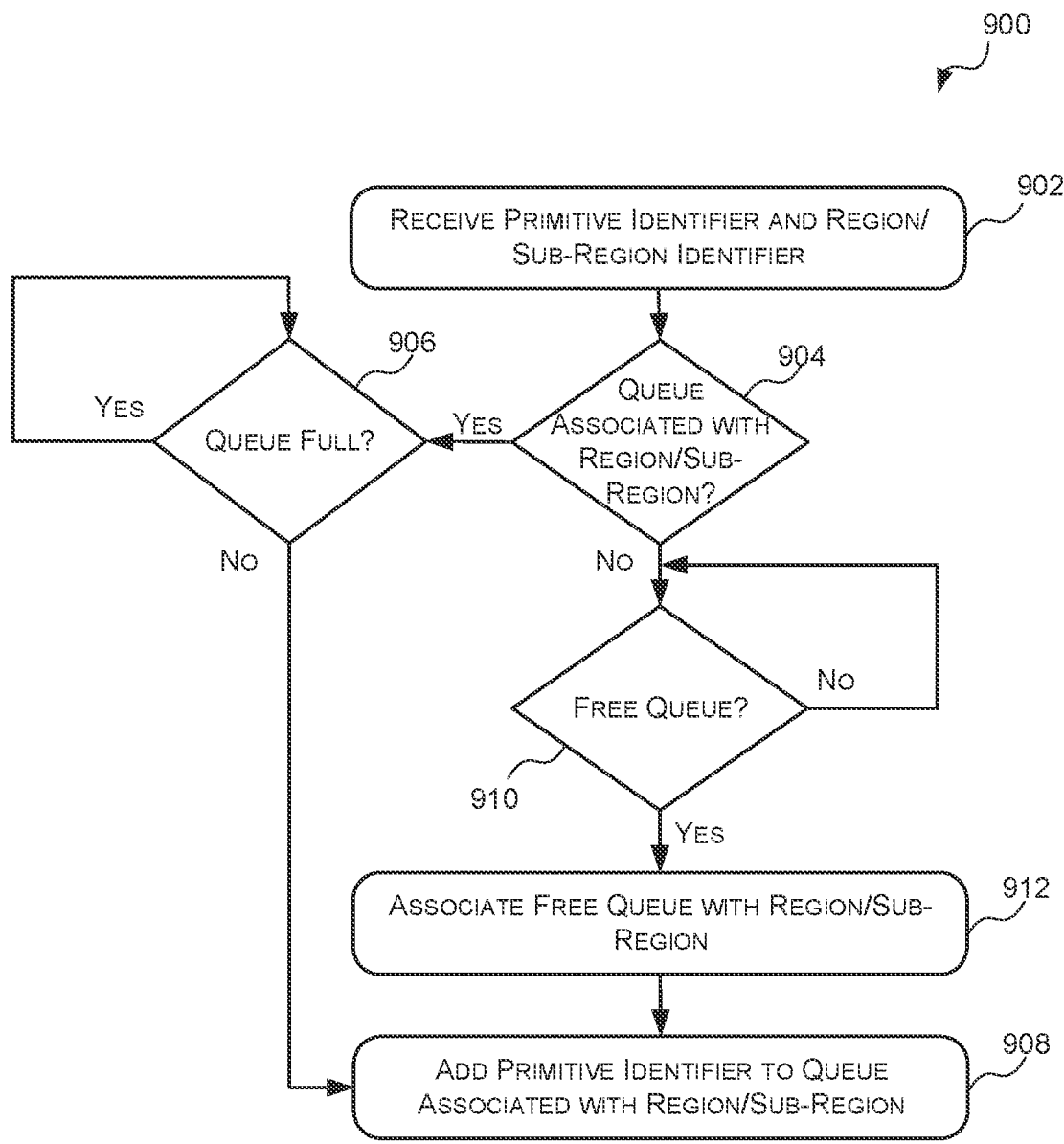
FIG. 9 is a flow diagram of an example method for adding a primitive identifier to a queue associated with a region/sub-region in which the primitive, at least partially, falls within.

Reference is now made to FIG. 9 which illustrates an example method of adding an identifier of a primitive to a queue associated with a particular region or sub-region that the primitive, at least partially, falls within. The method 900 may be implemented by the top level sorting logic 404 and/or the lower level sorting logic 410 of FIG. 4 to add an identifier of a primitive to a top level queue associated with a region the primitive, at least partially, falls within or to add an identifier of a primitive to a lower level queue associated with a sub-region the primitive, at least partially, falls within. The method 900 may also, or alternatively, be executed as part of blocks 812 and/or 820 of the method 800 of FIG. 8.

The method 900 begins at block 902 where information is received identifying a primitive and the region or sub-region that primitive, at least partially, falls within. Once the information identifying a primitive and the region/sub-region that primitive, at least partially, falls within, the method 900 proceeds to block 904. At block 904 a determination is made as to whether there is a queue associated with the identified region or sub-region. If it is determined at block 904 that there is a queue associated with the identified region or sub-region, then the method 900 proceeds to block 906. At block 906 a determination is made as to whether the queue associated with the identified region or sub-region is full. As described above, in some cases the queues may have a fixed size such that they can only store a certain number of primitive identifiers. If it is determined at block 906 that the queue associated with the identified region or sub-region is full, then the method 900 stalls until the queue associated with the identified region or sub-region is no longer full. If it is determined at block 906 that the queue associated with the identified region or sub-region is not full, then the method proceeds to block 908 where the primitive identifier is added to the queue associated with the identified region or sub-region.

If it is determined at block 904 that there is not a queue associated with/allocated to the identified region or sub-region, then the method 900 proceeds to block 910. At block 910 a determination is made as to whether there are any free queues at the appropriate level. For example, if the method 900 is being implemented by the top level sorting logic, then at block 910 it may be determined if there are any free top level queues; and if the method 900 is being implemented by a lower level sorting logic, then at block 910 it may be determined if there are any free lower level queues. A free queue may be a queue that does not comprise any primitive identifiers and/or that is not associated with a region/sub-region. If it is determined at block 910 that there are no free queues at the appropriate level, then the method 900 stalls until there is a free queue at the appropriate level. If it is determined at block 910 that there is at least one free queue at the appropriate level, then the method 900 proceeds to block 912 where one of the free queues is associated with/allocated to the identified region or sub-region. The method 900 then proceeds to block 908 where an identifier of the primitive is added to the queue associated with/ allocated to the identified region or sub-region.

As described above, in some cases a queue may not have a maximum size or a maximum number of primitive identifiers (e.g. the length or size of the queue may dynamically adapt). In these cases, block 906 may not be performed and the method 900 may proceed directly from block 904, yes, to block 908.

Multiple Banks of Queues

In some cases, the rasterization logic may be able to process multiple tiles at the same time (i.e. the rasterization logic may be able to process multiple partial display lists concurrently). For example, the rasterization logic may comprise a plurality of rasterization processing units which are each capable of processing one or more tiles (e.g. one or more partial display lists). In these cases, the queues of each lower level sorting unit 322 may be divided into a plurality of groups, or banks, and each bank may feed primitives into only a subset of the queues of lower levels and/or only a subset of rasterization processing units.

Figure 10:
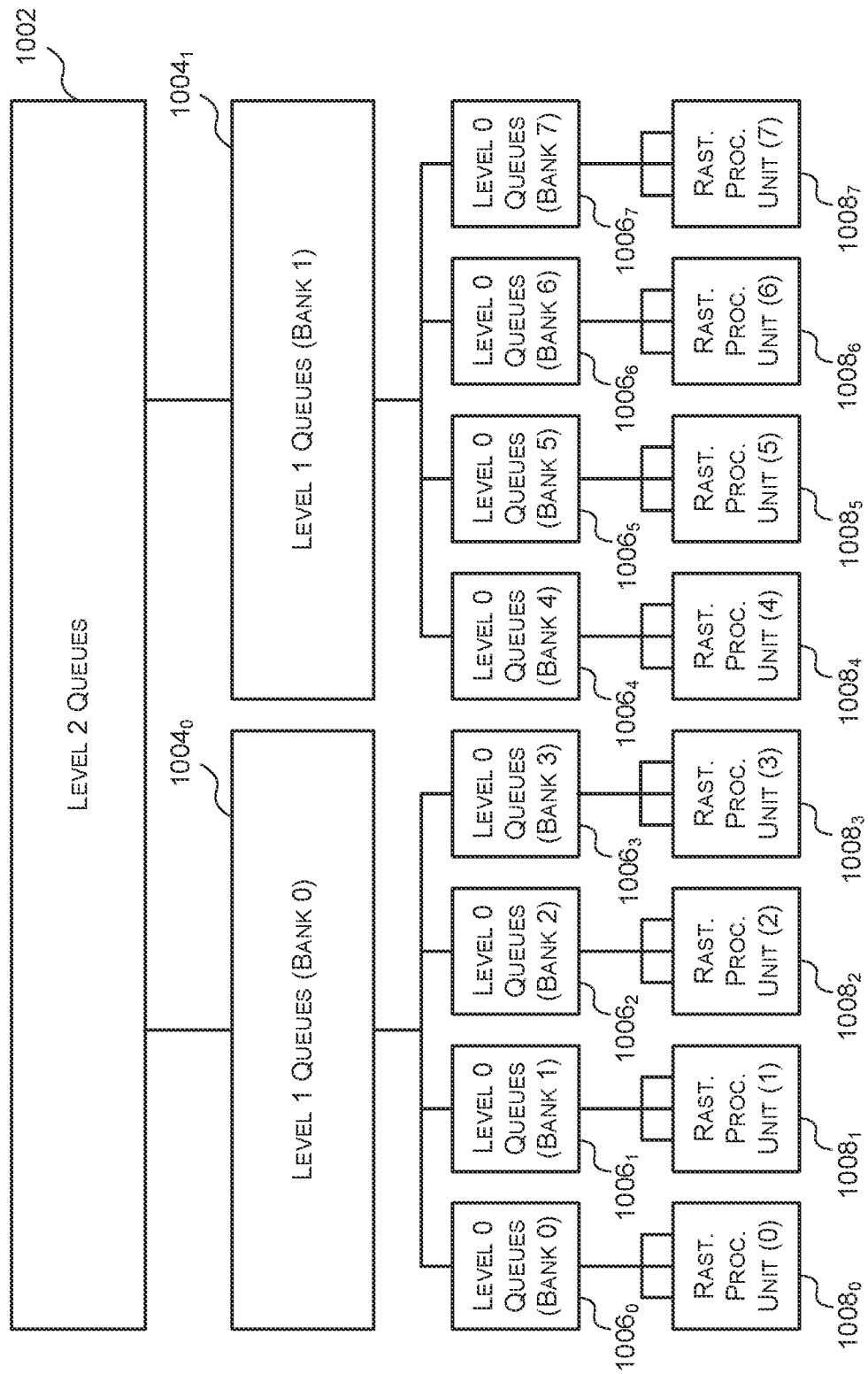
FIG. 10 is a block diagram of the queues of an example hierarchical tiling engine wherein the queues are grouped into blocks.

For example, reference is now made to FIG. 10 which illustrates the queues of an example chain of sorting units. In this example there is a top level sorting unit (which may be referred to herein as the level 2 sorting unit) with a set of level 2 queues 1002; and two lower level sorting units—a level 1 sorting unit with a set of level 1 queues $1004_0$, $1004_1$, and a level 0 sorting unit with a set of level 0 queues $1006_0$-$1006_7$. The level 1 queues are divided into two groups or banks $1004_0$ and $1004_1$ and the level 0 queues are divided into eight groups or banks $1006_0$-$1006_7$. Each bank of queues of a lower level sorting unit may only feed primitives into a subset of the queues of the lower levels and/or only a subset of rasterization processing units. In other words, each bank of queues of a lower level sorting unit may only be processed by a subset of the queues of the next level sorting unit or a subset of the rasterization processing units. A bank of queues is said to be used to process a queue associated with a region if the queues in that bank are used to sort the primitives identified in that queue into sub-regions.

Specifically, in the example of FIG. 10 either of the level 1 banks can be used to process a level 2 queue. The level 1 arbiter (not shown) may use any suitable means and/or criteria for selecting which level 1 bank is to be used to process a particular level 2 queue. In some cases, the level 1 arbiter may be configured to alternate between the two banks of level 2 queues. For example, the level 1 arbiter may be configured such that the first selected level 2 queue is processed using the first bank of level 1 queues, the second selected level 2 queue is processed using the second bank of level 1 queues, the third selected level 2 queue is processed using the first bank of level 1 queues. In other cases, the level 1 arbiter may be configured to select a bank of queues to be used to process a level 2 queue based on other criteria, such as spatial proximity.

In the example of FIG. 10, only a subset of the level 0 queues can be used to process the queues of each level 1 bank. For example, the first bank of level 1 queues can only be processed using the first four banks of level 0 queues, and the second bank of level 1 queues can only be processed using the last four banks of level 0 queues. The level 0 arbiter (not shown) may use any suitable means or criteria for selecting which of the four available level 0 banks is to be used to process a particular level 1 queue. For example, the level 0 arbiter may be configured to select from the available level 0 banks on a round robin basis or the level 0 arbiter may be configured to select from the available level 0 banks on a spatially similar basis (e.g. such that level 1 queues that are related to spatially similar regions/sub-regions are processed by the same bank of queues).

Similarly, in the example of FIG. 10, only a subset of the rasterization processing units $1008_0$-$1008_7$ can be used to process the queues of each level 0 bank. Specifically, the queues of each level 0 bank can be processed by only a single rasterization processing unit—i.e. only the first rasterization processing unit can be used to process the queues of the first level 0 queue bank, only the second rasterization processing unit can be used to process the queues of the second level 0 queue bank, only the third rasterization processing unit can be used to process the queues of the third level 0 queue bank and so on. Each rasterization processing unit may be able process one or more level 0 queues concurrently. In other words, as each level 0 queue represents a partial display list each rasterization processing unit may be able to process one or more partial display lists concurrently.

Although in this example there is a one-to-one relationship between level 0 queue banks and rasterization processing units, in other examples there may be a one-to-many relationship between level 0 queue banks and rasterization processing units. For example, in other cases the queues of each level 0 bank may be processed by a plurality of rasterization processing units. In these cases, the output unit (not shown) which is situated between the level 0 sorting unit and the rasterization processing units may use any suitable means for allocating level 0 queues to the available rasterization processing units. For example, the output unit may be configured to allocate level 0 queues to the available rasterization processing units on a round robin basis or based on spatial proximity of the regions associated with the queues so that queues that are related to spatially similar regions are processed by the same rasterization processing unit.

Since it is important that the primitives in each tile (e.g. the smallest sub-region in the hierarchy) are processed in the order in which they are received, it is important that the partial display lists for a tile are processed in the order in which they are generated. Specifically, it is important that a first partial display list for a tile is processed by the rasterization processing units prior to a second (later generated) partial display list for that tile To ensure that the partial display lists for a tile are processed in the order in which they are generated the arbiters and output unit may be configured to keep track of the regions or sub-regions that are currently being processed by each queue bank or by each rasterization processing logic respectively.

For example, each arbiter (e.g. the level 1 arbiter (which selects level 2 queues to be processed by the level 1 sorting unit) and the level 0 arbiter (which selects level 1 queues to be processed by the level 0 sorting unit)) and the output unit may be configured to maintain, for each queue bank/rasterization processing unit, a counter for each region of the preceding sorting unit/level that indicates whether or not that region is being processed by that queue bank or by that rasterization processing unit. A region is being processed by a queue bank or a rasterization processing unit if (i) that queue bank or rasterization processing unit is currently processing that region; or (ii) a queue bank or a rasterization processing unit that is fed by that queue bank is currently processing that region. An arbiter or the output unit may then be configured to, when it selects a queue of the preceding sorting unit/level for processing, review the counters and if the counters indicate that a particular queue bank/rasterization processing unit is currently processing the region or sub-region associated with that queue, then the arbiter or output unit cannot send that queue to another queue bank or rasterization processing unit for processing.

An example implementation of the reference counting mechanism will now be described for a chain of sorting units that comprises a top level sorting unit (i.e. a level 2 sorting unit) that sorts primitives into four level 2 regions A, B, C and D, a first lower level sorting unit (i.e. a level 1 sorting unit) that sorts primitives in each level 2 region A, B, C, D into four level 1 sub-regions A-1, A-2, A-3, A-4, B-1, B-2, B-3, B-4, C-1, C-2, C-3, C-4, D-1, D-2, D-3, D4 and the level 1 queues are grouped into two banks as shown in FIG. 10, and a second lower level sorting unit (i.e. a level 0 sorting unit) that sorts primitives in each level 1 region into four level 0 sub-regions A-1-1, A-1-2, A-1-3, A-1-4, A-2-1, A-2-2 etc. and the level 0 queues are grouped into eight banks as shown in FIG. 10.

The level 1 arbiter (which is configured to select level 2 queues to be processed by the level 1 sorting logic and allocate each selected level 2 to one of the two level 1 queue banks) may be configured to maintain, for each level 1 queue bank, a counter for each level 2 region. Specifically, for each of the two level 1 queue banks, the level 1 arbiter may be configured to maintain a counter for each of the four level 2 regions as shown in Table 1. When the level 1 sorting unit associates a queue of a level 1 bank to a sub-region of a level 2 region, the counter for that level 2 region is incremented. For example, if the level 1 sorting unit associates a queue of the level 1 bank 0 to each of sub-regions A-1, A-2, A-3 and A-4 the counter for region A for bank 0 may be incremented by four as shown in Table 1. The level 1 arbiter may then be configured to send a selected level 2 queue associated with a region to a level 1 bank only if the counter for the region for the other level 1 bank 1 is zero. For example, in Table 1 the level 1 arbiter cannot send a region A queue to level 1 bank 1 as region A is currently being processed by level 1 bank 0.

TABLE 1

| Region | Bank 0 Counters | Bank 1 Counters |
|--------|-----------------|-----------------|
| A      | 4               | 0               |
| B      | 0               | 0               |
| C      | 0               | 0               |
| D      | 0               | 0               |

The level 0 arbiter (which is configured to select level 1 queues to be processed by the level 0 sorting logic and allocate each selected level 1 queue to one of the level 0 queue banks associated with that level 1 bank) may be configured to maintain, for each level 0 queue bank, a counter for each level 1 region as shown in Table 2. When the level 0 sorting unit associates a queue of a level 0 bank to a sub-region of a level 1 region, the counter for that level 1 region is incremented. For example, if the level 0 sorting unit associates a queue of level 0 bank 1 to each of sub-regions A-1-1, A-1-2, and A-1-4, the counter for sub-region A-1 for bank 0 may be incremented by three as shown in Table 1. The level 0 arbiter may then be configured to send a level 1 queue associated with a sub-region to a level 0 bank only if the counters for the sub-region for the other level 0 banks is zero. For example, in Table 2 the level 0 arbiter cannot send a sub-region A-1 queue to level 0 bank 1 as sub-region A-1 is currently being processed by level 0 bank 0.

TABLE 2

| Sub-Region | Bank 0 | Bank 1 | Bank 2 | Bank 3 | Bank 4 | Bank 5 | Bank 6 | Bank 7 |
|---|---|---|---|---|---|---|---|---|
| A-1 | 3 | 0 | 0 | 0 | 0 | 0 | 0 | 0 |
| A-2 | 0 | 0 | 0 | 0 | 0 | 0 | 0 | 0 |
| A-3 | 0 | 0 | 0 | 0 | 0 | 0 | 0 | 0 |
| A-4 | 0 | 0 | 0 | 0 | 0 | 0 | 0 | 0 |
| B-1 | 0 | 0 | 0 | 0 | 0 | 0 | 0 | 0 |
| ... | | | | | | | | |

The output unit may also be configured to maintain, for each rasterization processing unit, a counter for each level 0 region as shown in Table 3. When the output unit sends or outputs a level 0 queue associated with a level 0 region, the counter for that level 0 region is incremented. For example, if the output unit sends/outputs a level 0 queue associated with sub-region A-1-1 to rasterization processing unit 0 then the counter for sub-region A-1-1 for rasterization processing unit 0 is incremented by 1 as shown in Table 3.

TABLE 3

| Sub-Region | Rast. Proc. Unit 0 | Rast. Proc. Unit 1 | Rast. Proc. Unit 2 | Rast. Proc. Unit 3 | Rast. Proc. Unit 4 | Rast. Proc. Unit 5 | Rast. Proc. Unit 6 | Rast. Proc. Unit 7 |
|---|---|---|---|---|---|---|---|---|
| A-1-1 | 1 | 0 | 0 | 0 | 0 | 0 | 0 | 0 |
| A-1-2 | 0 | 0 | 0 | 0 | 0 | 0 | 0 | 0 |
| A-1-3 | 0 | 0 | 0 | 0 | 0 | 0 | 0 | 0 |
| A-1-4 | 0 | 0 | 0 | 0 | 0 | 0 | 0 | 0 |
| A-2-1 | 0 | 0 | 0 | 0 | 0 | 0 | 0 | 0 |
| ... | | | | | | | | |

The output unit may also be configured to receive information from the rasterization processing units indicating when they have finished processing a sub-region (e.g. tile). When the output unit receives information indicating that a rasterization processing unit has finished processing a sub-region the relevant counter for that sub-region is decremented. For example, if the output unit receives information that a rasterization processing unit has finished processing a sub-region A-1-1 then the output unit may decrement the appropriate A-1-1 counter. If the decrement causes an output unit counter to be zero, the output unit may be configured to send an update to the level 0 arbiter indicating that the rasterization processing units have finished processing that sub-region. Upon receiving such an indication, the level 0 arbiter may be configured to decrement the level 0 counter associated with that sub-region. For example, if the level 0 arbiter receives an indication that the rasterization processing units are finished processing sub-region A-1-1 then the level 0 arbiter may decrement the appropriate A-1 counter by 1. If decrementing the counter causes the level 0 counter to be zero, the level 0 arbiter may then send information to the level 1 arbiter indicating that the rasterization processing units are done processing that sub-region. Upon receiving such an indication, the level 1 arbiter may be configured to decrement the level 1 counter associated with that sub-region. For example, if the level 1 arbiter receives an indication that the rasterization processing units are finished processing sub-region A-1 then the level 1 arbiter may decrement the appropriate A counter. When a level 1 counter for a level 2 region becomes zero then there are no restrictions on where a queue associated with that level 2 region may be sent for processing.

It will be evident to a person of skill that this is an example only, and that in other cases some higher level queues may be able to be processed by multiple lower level queue banks. For example, one level 1 queue bank may be able to be processed by any level 0 queue bank.

Non-Contiguous Regions/Sub-Regions

As described above, the queues at each level may have a fixed size which limits the number of primitive identifiers that can be stored in a queue at the same time. However, the queues of one sorting level may have a different size from the queues of another sorting level. For example, in some cases, the queues of a higher level sorting unit may be larger than the queues of a lower level sorting unit (e.g. the queues of the top level sorting unit 320 may be larger than the queues of the lower level sorting unit 322). However, this is an example only and in other cases the queues of a lower level sorting unit may be larger than the queues of a higher level sorting unit.

In some cases, if it is determined, by for example a sorting unit 320, 322, that a primitive falls, at least partially, within a region or sub-region, but the queue associated with the region or sub-region is full (e.g. the queue associated with the region or sub-region has a maximum number of primitive identifiers) then the sorting unit 320, 322 may stall until the relevant queue is no longer full. Preferably the queues of each level are sized so that for an average set of primitives for a render the queues will be processed by the lower level sorting unit or the output unit prior to becoming full. However, in some cases, the primitives for a render may be particularly heavily spatially localised such that there will be an unusually high number of primitives that fall within a region or sub-region in a short period of time. In these cases, to reduce the number of stalls due to a queue being full, the regions or sub-regions used at one or more sorting levels may be configured to be non-contiguous.

Figure 11:
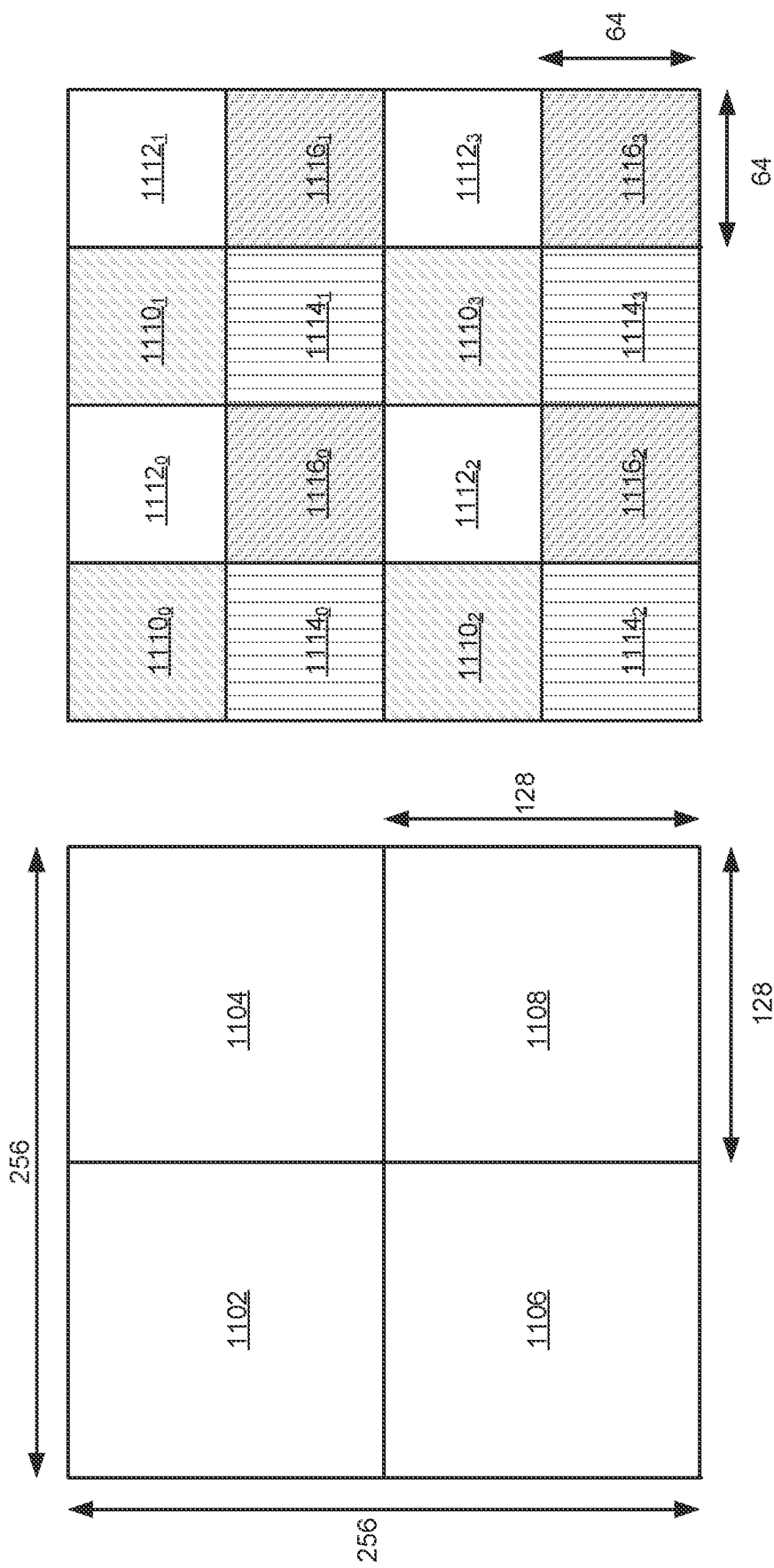
FIG. 11 is a schematic diagram illustrating contiguous and non-contiguous regions of an example rendering space.

For example, if a sorting unit is configured to sort primitives in a 256×256 region into four 128×128 sub-regions thereof, instead of using four contiguous 128×128 sub-regions 1102, 1104, 1106, 1108 as shown in FIG. 11, the sorting unit may be configured to use four non-contiguous 128×128 sub-regions. For example, each contiguous 128×128 region may be divided into four contiguous 64×64 sub-regions and each non-contiguous 128×128 region may be formed of one 64×64 region in each contiguous 128×128 region. For example, as shown in FIG. 11, a first non-contiguous 128×128 region may be formed from the upper left 64×64 region $1110_0$, $1110_1$, $1110_2$, $1110_3$ of each contiguous 128×128 region; a second non-contiguous 128×128 region may be formed from the upper right 64×64 region $1112_0$, $1112_1$, $1112_2$, $1112_3$ of each contiguous 128×128 region; a third non-contiguous 128×128 region may be formed from the bottom left 64×64 region $1114_0$, $1114_1$, $1114_2$, $1114_3$ of each contiguous 128×128 region; and a fourth non-contiguous 128×128 region may be formed from the bottom right 64×64 region $1116_0$, $1116_1$, $1116_2$, $1116_3$ of each contiguous 128×128 region.

As the 64×64 regions that make up each non-contiguous 128×128 region are not spatially adjacent, if a set of primitives fall within any contiguous 128×128 region they will be spread out among the non-contiguous 128×128 regions, thus they will be spread out among the queues related to the non-contiguous 128×128 regions, decreasing the likelihood that any one queue becomes full. However, using non-contiguous regions means that some primitives that may have fallen in only a single contiguous 128×128 region may fall within several non-contiguous 128×128 regions meaning that the identifiers for those primitives have to be added to multiple queues instead of just one. Determining whether a primitive falls, at least partially, within a non-contiguous region may be slightly more complex than determining whether a primitive falls within a contiguous region, however, dividing the rendering space into non-contiguous regions may allow the queues to be used more efficiently which may result in an overall performance improvement.

In any of the tiling engines and methods described herein there may be none, one, or more than one sorting level that implements non-contiguous regions or sub-regions.

Storing Unit and Local Transformed Geometry Buffer

As described above, in some cases, the storing unit 318 may be configured to store primitives (e.g. the transformed geometry data related thereto) in the local transformed geometry buffer 311 on a primitive basis. For example, in these cases, when the storing unit 318 receives a primitive, the storing unit 318 may determine whether there is enough free space in the local transformed geometry buffer 311 to store the primitive (e.g. the transformed geometry data related thereto). If the storing unit 318 determines that there is enough free space in the local transformed geometry buffer 311 to store the transformed primitive (e.g. the transformed geometry data related thereto), then the storing unit 318 may store the transformed primitive in the local transformed geometry buffer 311 and send the primitive (e.g. the transformed geometry data related thereto) to the top level sorting unit 320 along with information indicating the location of the primitive (e.g. the transformed geometry data related thereto) in the local transformed geometry buffer 311.

In general, a primitive (e.g. the transformed geometry data related thereto) cannot be removed from the transformed geometry buffer until there are no queues of the tiling engine 310 that refer to that primitive (i.e. include an identifier therefor) and the rasterization logic no longer requires access to the transformed geometry data for that primitive. In some cases, the rasterization logic may comprise a plurality of stages and the rasterization logic may be deemed to no longer require the transformed geometry data for a primitive for a particular tile when any of the stages indicate that the transformed geometry data for that primitive is no longer required for that particular tile. For example, as shown in FIG. 3 the rasterization logic 306 may comprise HSR logic 314 that implements a hidden surface removal stage, and texturing/shading logic 316 which implements a texturing/shade stage. In these cases, the rasterization logic may be deemed to no longer require the transformed geometry data for a primitive for a particular tile when either the HSR logic 314 or the texturing/shading logic indicates they no longer require the transformed geometry data related to that primitive for that tile.

As described above, HSR logic 314 is configured to eliminate primitive fragments generated by the rasterizer 312 that are hidden in the tile. The HSR logic 314 may indicate that the transformed geometry data for a primitive is no longer required for a particular tile if the HSR logic 314 does not output any fragments that relate to that primitive (i.e. that all the fragments related to that primitive are hidden in the tile). In some cases, the HSR logic 314 may be configured to receive primitive fragments related to a tile as a stream of data and there may be markers inserted in the stream to separate primitives (and to separate primitive blocks when stored in primitive blocks) and the HSR logic 314 may be configured to determine the transformed geometry data related to a primitive is no longer needed for a tile when it outputs two primitive markers without any primitive fragments output in between.

In some cases, the HSR logic 314 may comprise two sub-stages—a first sub-stage in which depth testing is performed on primitive fragments related to a tile, and a second sub-stage in which the primitive fragments that survive the depth testing are stored in a tag buffer. For example, the HSR logic 314 may comprise depth testing logic and a tag buffer. The depth testing logic receives primitive fragments and compares the depth values (e.g. Z value or Z co-ordinate) of the primitive fragments to the corresponding depth value in a depth buffer for the tile. Specifically, the depth buffer stores the 'best' depth value (e.g. the one that is closest to the viewer) for each sample of the tile. If the received primitive fragment has a 'worse' depth value (e.g. a depth value that indicates it is further from the viewer) than the corresponding depth value in the depth buffer, then the primitive fragment will be hidden by another primitive and so the primitive fragment 'fails' the depth test and is not output to the tag buffer. If, however, the received primitive fragment has a 'better' depth value (e.g. a depth value that indicates it is closer to the viewer) than the corresponding depth value in the depth buffer, the primitive fragment 'passes' the depth test. The primitive fragment is then output to the tag buffer and the corresponding depth value in the depth buffer is updated to indicate there is a new 'best' depth value.

The tag buffer receives primitive fragments that have passed the depth test stage and for each received primitive fragment updates the tag buffer to identify that received primitive fragment as the primitive fragment that is visible at its sample position. For example, if the tag buffer receives a primitive fragment x at sample location a then the tag buffer stores information indicating that the primitive fragment x is visible at sample location a. If the tag buffer subsequently receives a primitive fragment y at sample location, a then the tag buffer updates the information for sample location a to indicate that in fact it is primitive fragment y that is visible. Accordingly, in a simple case where all of the primitives are opaque, after a set of primitive fragments associated with a tile (e.g. the primitive fragments associated with a partial display list) have been processed by the depth testing logic, the tag buffer comprises the identity of the primitive fragments (to date) that are visible at each sample location. At this point the tag buffer may be flushed to the texturing/shading logic 316 where texturing and shading are performed on the primitive fragments that are visible. By performing the texturing and shading after hidden surface removal, time and resources are not wasted texturing and shading primitives/primitive fragments which will not be visible in the final image.

Accordingly, it is possible for a primitive (primitive fragment) to fail at the depth test sub-stage or fail at the tag buffer sub-stage. Specifically, it may fail the depth test and thus not be output by the depth testing logic, or it may pass the depth test because at the time the depth test is performed it has the 'best' depth, but later on a primitive fragment at the same sample position may come along with a better depth and thus it is overwritten in the tag buffer thus it is never output from the tag buffer. In these cases, it may be determined that the rasterization logic no longer requires the transformed geometry data related to a primitive of a tile if either the depth testing logic or the tag buffer indicate that the transformed geometry data related to that primitive is no longer required for the tile.

In these cases, the depth testing logic may be configured to generate an indication that the transformed geometry data for a primitive is no longer needed for a tile when it detects that a primitive has failed the depth-test stage. A primitive is said to have failed the depth test if none of the primitive fragments related to that primitive are processed past the depth testing. In other words, a primitive will have failed the depth test if the depth testing indicates that none of the primitive fragments related to that primitive are visible in the tile.

Similarly, the tag buffer may be configured to generate an indication that the transformed geometry data for a primitive is no longer needed for a tile when it detects that a primitive has failed the tag buffer stage. A primitive is said to have failed the tag buffer stage if the tag buffer received at least one primitive fragment for that primitive, but none of the primitive fragments for that primitive were output from the tag buffer to the next module (e.g. the texturing/shading logic 316). To be able to determine when a primitive has failed the tag buffer stage, the tag buffer may have a mechanism for tracking which primitive fragments were received since entries of the tag buffer itself can be overwritten. Accordingly, in some cases, the tag buffer may have a look-up table, or similar structure, which has an entry for each primitive which indicates whether or not it has received a primitive fragment for that primitive from the depth testing logic. Then when the tag buffer is flushed (e.g. the contents thereof are sent to the next stage—e.g. the texturing/shading logic 316) the contents of the tag buffer are compared to the look-up table and if there are any primitives for which a primitive fragment was received but no primitive fragment related thereto is being output, the tag buffer may generate an indication that the transformed geometry data related to that primitive is no longer required for the tile.

As described above, the texturing/shading logic 316 is configured to perform texturing and/or shading on the primitive fragments received from the HSR logic 314 to determine pixel values of a rendered image. The rendered pixel values for a tile are then stored in memory (e.g. frame buffer). Accordingly it may be determined that the rasterization logic no longer requires the transformed geometry data related to a primitive when the texturing/shading logic 316 has finished processing the attributes associated with the primitive fragments related to that primitive (which may be before shading is performed).

Where the primitives (e.g. the transformed geometry data related thereto) are stored in the local transformed geometry buffer 311 on a primitive basis, to determine when a transformed primitive (e.g. the transformed geometry data thereto) can be removed from the local transformed geometry buffer 311 the storing unit 318 may be configured to maintain a reference counter for each primitive. The reference counter for a primitive may be incremented when sorting logic 404, 410 adds that primitive's identifier to a queue $402_0$-$402_N$, $406_0$-$406_K$ or when the output unit 324 sends a partial display list that includes that primitive's identifier to the rasterization logic. The reference counter for a primitive may be decremented when an arbiter 408 or the output unit 324 removes a primitive's identifier from a queue $402_0$-$402_N$, $406_0$-$406_K$, or when the rasterization logic has finished processing the transformed geometry data for that primitive with respect to a particular tile (e.g. when the depth test logic, the tag buffer or the texturing/shading logic indicates/determines that the transformed geometry data for that primitive is no longer required for the tile). When the reference counter for a primitive reaches zero the transformed geometry data related to that primitive can be removed from the local transformed geometry buffer 311.

In other cases, the storing unit 318 may be configured to group the transformed primitives into primitive blocks and store the transformed primitives (e.g. the transformed geometry data related thereto) in the local transformed geometry buffer 311 in primitive blocks. A primitive block is a structure in which multiple primitives (e.g. the transformed geometry data related thereto) are stored together. Storing the primitives in primitive blocks may allow the transformed geometry data for a set of primitives to be stored more efficiently in the local transformed geometry buffer 311. Specifically, the transformed geometry data for a primitive often comprises transformed vertex information for a plurality of vertices where the vertices are shared between (or are common to) multiple primitives. Accordingly, where multiple primitives in the same primitive block share a vertex the data related to that vertex only needs to be stored once in the primitive block. Furthermore, storing the primitives (e.g. the transformed geometry data) in primitive blocks allows a reference counter per primitive block instead of a reference counter per primitive, which may significantly reduce the number of reference counters that need to be stored and maintained. The reference counter for a primitive block may be incremented and decremented in the same manner as a reference counter for a primitive—i.e. the counter for a primitive block may be incremented when a primitive block identifier is added to a queue or when a partial display list that refers to that primitive block is sent to the rasterization logic; and the counter for a primitive block may be decremented when the primitive block identifier is removed from a queue or when the rasterization logic has finished processing, with respect to a particular tile, the transformed geometry data for the primitive block (e.g. when the depth test logic, the tag buffer or the texturing/shading logic indicates/determines that the transformed geometry data in a primitive block is no longer required for the tile).

Figure 12:
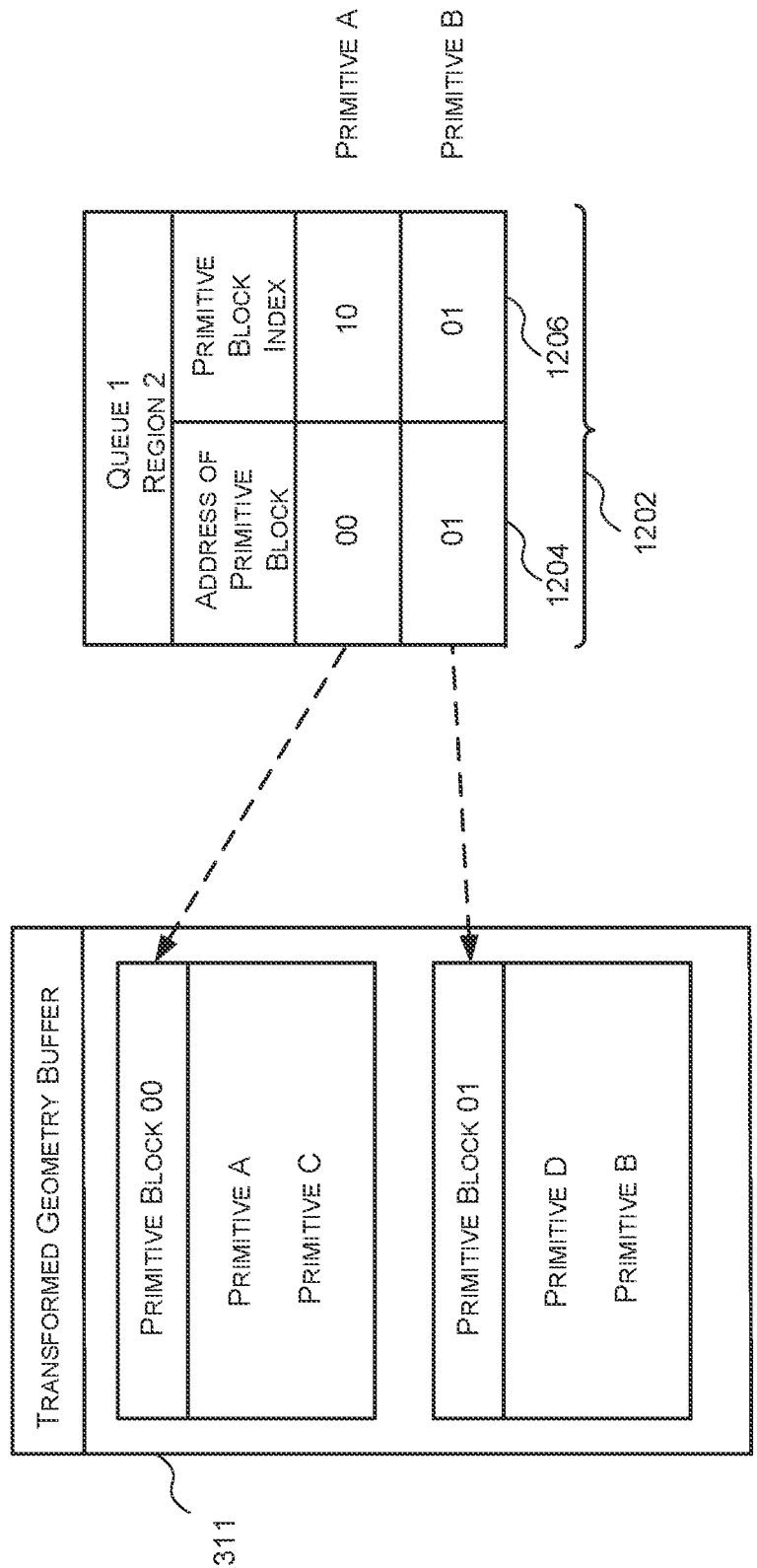
FIG. 12 is a schematic diagram illustrating an example primitive identifier.

When the primitives are stored in the local transformed geometry buffer in primitive blocks, each primitive identifier 1202 may comprise information 1204 identifying the primitive block (e.g. an address of the primitive block) in which the primitive is stored and information 1206 identifying the location of the primitive within that primitive block (e.g. an index into the primitive block) as shown in FIG. 12. This may allow the primitive identifiers to be smaller, relative to cases where the primitives are stored in the local transformed geometry buffer on a primitive basis, which may in turn allow the queues to be smaller, or allow more identifiers to be stored in the queues.

The primitives may be grouped into primitive blocks in any suitable manner. In some cases, the storing unit 318 may be configured to group primitives into primitive blocks in accordance with the order in which they are received at the storing unit 318. In these cases, each primitive block may have a maximum size (e.g. in terms of bits or bytes), a maximum number of primitives which can belong to a primitive block, and/or a maximum number of vertices that can belong to a primitive block and the storing unit 318 may be configured to add primitives to a current primitive block until one or more of the maximums is reached. Once a maximum has been reached, the storing unit 318 may be configured to determine if there is enough free memory in the local transformed geometry buffer 311 to store the current primitive block. If the storing unit 318 determines that there is not enough free space in the local transformed geometry buffer 311 to store the current primitive block, then the storing unit 318 may stall until there is enough free space. If, however, the storing unit 318 determines that there is enough free space in the local transformed geometry buffer 311 then the current primitive block may be stored in the local transformed geometry buffer 311 and the primitives that form that block may be sent to the top level sorting unit 320 along with an indication of the location of the primitive block in the transformed geometry buffer and an indication of the location of each primitive within that primitive block.

In other cases, the primitives may be spatially grouped into primitive blocks. For example, the rendering space may be divided into macro regions which may encompass multiple rendering tiles (e.g. a 1024×1024 rendering space that is divided into one thousand twenty-four 32×32 tiles may have sixteen 256×256 macro regions) and the storing unit 318 may be configured to maintain a primitive block for each macro region. Then, when a storing unit 318 receives a primitive, it determines which macro region(s) the primitive, at least partially, falls within. If the storing unit 318 determines that the primitive falls, at least partially, within only one macro region, then the storing unit 318 may place the primitive (i.e. the transformed geometry data related to that primitive) in the primitive block for that macro region. If the storing unit 318 determines that the primitive falls within more than one macro region then the storing unit 318 may be configured to (i) select one of the macro regions the primitive falls within (e.g. the first one) and place the primitive (i.e. the transformed geometry data related thereto) in the primitive block for the selected macro region; or (ii) place the primitive (i.e. the transformed geometry data related thereto) in the primitive block for each of the macro regions the primitive falls, at least partially, within. Implementing (ii) may mean that the transformed geometry data for some primitives is stored multiple times in the local transformed geometry buffer. However, it may allow more efficient use of the local transformed geometry buffer 311 as it may allow primitive blocks to be more quickly removed from the local transformed geometry buffer 311 because primitives block do not have to wait for primitives in the blocks to be processed in multiple macro regions.

When primitives are spatially grouped into primitives blocks, the primitive blocks may have, for example, a maximum total size (e.g. in terms of bits or bytes of data), a maximum number primitives and/or a maximum number of vertices. Then, when the storing unit 318 adds a primitive to a primitive block, the storing unit 318 may determine if that primitive block has reached a maximum (e.g. a maximum size, a maximum number of primitives or a maximum number of vertices). If a maximum has been reached for the primitive block, then the storing unit 318 may determine if there is enough free space in the local transformed geometry buffer 311 for that primitive block. If there is not enough space, then the storing unit 318 may stall until there is enough free space. If, however, there is enough free space in the local transformed geometry buffer 311 for that primitive block, then the storing unit 318 may be configured to: (i) write the primitive block to the local transformed geometry buffer; (ii) provide the primitives (e.g. the transformed geometry data related thereto) to the top level sorting unit 320 along with an indication of where they are stored in the local transformed geometry buffer and what primitive block they belong to; and (iii) open a new primitive block for the corresponding macro region.

Figure 13:
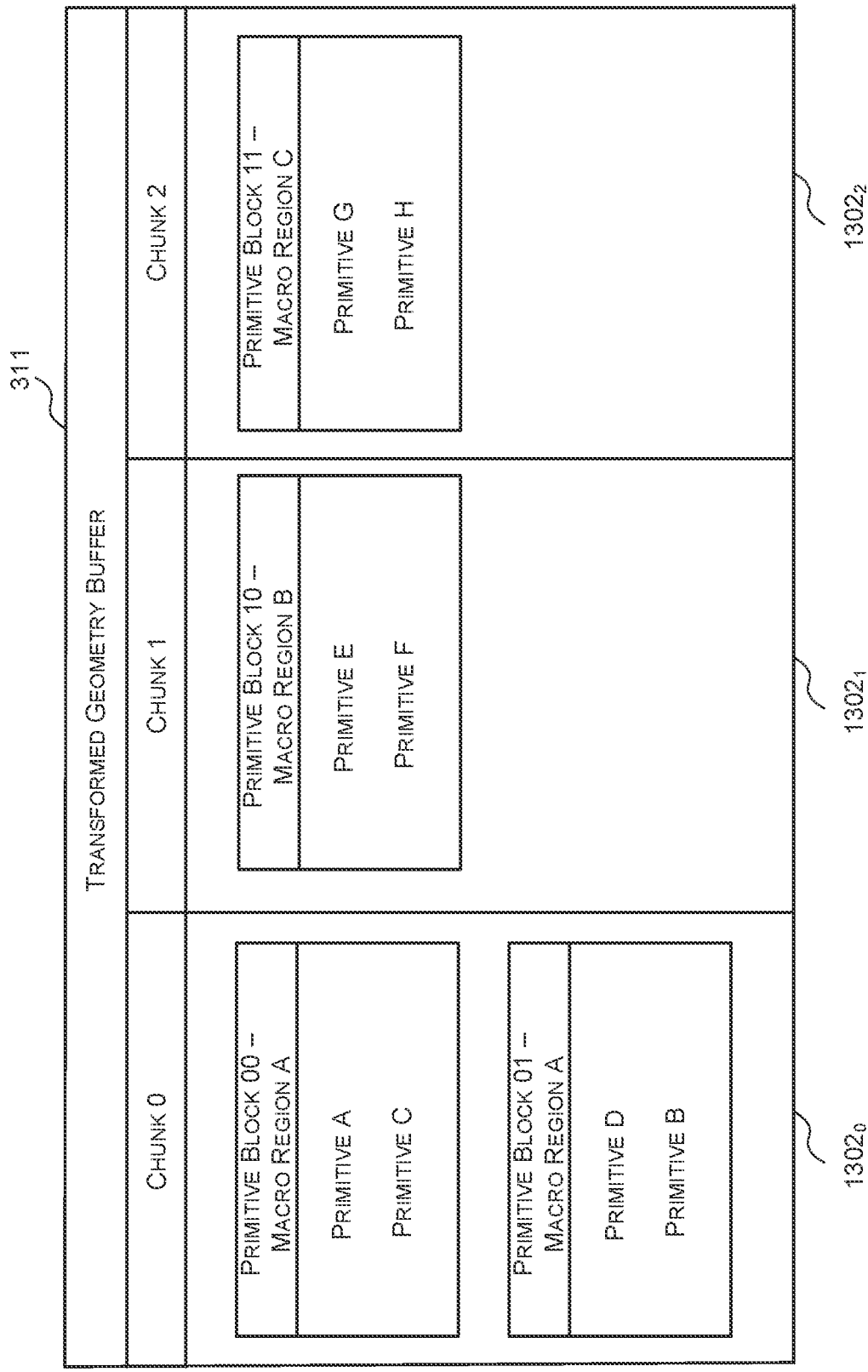
FIG. 13 is a schematic diagram illustrating an example transformed geometry buffer that is sub-divided into a plurality of chunks/pages.

In some cases, as shown in FIG. 13, the memory of the local transformed geometry buffer 311 may be divided, or partitioned, into a plurality of fixed-size chunks $1302_0$, $1302_1$, $1302_2$ (e.g. regions or pages) and the memory may only become 'free' or available on a per chunk (e.g. per region or per page) basis. Each chunk (e.g. page) $1302_0$, $1302_1$, $1302_2$ may be able to store multiple primitive blocks (depending on their size), but does not become 'free' or available until all of the primitive blocks that are stored in the chunk become 'free' or available. Primitive blocks (depending on their size) may also be able to span multiple chunks (e.g. pages). Where the local transformed geometry buffer 311 is partitioned in this manner, the storing unit 318 may be configured to maintain a reference counter per chunk (e.g. page). The per chunk reference counters may be incremented and decremented in a hierarchical manner. For example, the storing unit 318 may be configured to maintain for each chunk: a reference counter for that chunk; a reference counter for each primitive block in that chunk; and a reference counter for each primitive in a primitive block in the chunk. Specifically, the reference counter for a primitive that is in a primitive block in the chunk (e.g. page) may be incremented when the primitive identifier for that primitive is added to a queue or when a partial display list that comprises that primitive identifier is sent to the rasterization logic. If the primitive reference counter is incremented from zero to a non-zero number (e.g. 1) then the reference counter for the primitive block that primitive is in is incremented. Similarly, if the primitive block reference counter is incremented from zero to a non-zero number (e.g. 1) then the reference counter for the relevant chunk is incremented. The reference counter for a primitive may then be decremented when the primitive identifier for that primitive is removed from a queue or when the rasterization logic has finished processing, for a tile, the transformed geometry data related to that primitive (e.g. when the depth test logic, the tag buffer or the texturing/shading logic indicates/determines that the transformed geometry data for that primitive is no longer required for the tile). If the primitive reference counter is decremented to zero, then the corresponding primitive block reference counter is decremented. If a primitive block reference counter is decremented to zero, then the corresponding chunk reference counter is decremented. When the chunk reference counter reaches zero, the chunk of memory may be marked as 'free'.

In some cases, where the primitives are spatially grouped into primitive blocks such that any primitive block may only contain primitives that fall within one macro region, the storing unit 318 may be configured to only store primitives that relate to the same macro region in the same chunk (e.g. page) of memory of the local transformed geometry buffer 311. In other words, in these cases, any chunk (e.g. page) of memory can only store primitive blocks that relate to a single macro region. For example, if a primitive block that comprises primitives in macro region A is stored in chunk 0 $1302_0$, then the storing unit 318 may be configured to only store other primitive blocks that comprise primitives in macro region A in chunk 0 (e.g. page 0) $1302_0$. For example, if the storing unit 318 has compiled a new primitive block that comprises primitives in macro region B, even if there is enough space in chunk 0 (e.g. page 0) to store the new primitive block, the storing unit 318 may be configured to store the new primitive block in another chunk (e.g. page). Since primitives are often processed in the rasterization phase in substantially spatial order, storing primitive blocks that relate to the same macro region together may allow the chunks (e.g. pages) to become 'free' or available faster.

In some cases, when the physical memory of the local transformed geometry buffer 311 is sub-divided into chunks (e.g. pages) a virtual memory may be used to more efficiently manage the physical memory of the local transformed geometry buffer 311 and reduce fragmentation thereof. Specifically, it may be preferable that each primitive block be accessible by a contiguous set of addresses. This allows any portion of the primitive block to be accessible using a combination of the primitive block starting address and an offset. In these cases, when the local transformed geometry buffer 311 is divided into chunks (e.g. pages) if there is not a contiguous block of physical memory large enough to store the primitive block, the storing unit 318 may have to stall writing a primitive block to the local transformed geometry buffer 311 until a contiguous block of memory large enough to store the primitive block is free, even if there is enough non-contiguous memory to store the primitive block. For example, if the memory of the local transformed geometry buffer 311 is divided into six chunks (e.g. pages) numbered from 0 to 5 and the even numbered chucks (e.g. pages) are full, but the odd numbered chunks are free, and the storing unit wants to write a primitive block that requires three chunks (e.g. pages), the storing unit will stall writing the primitive block to memory even though there are three free chunks of memory (chunks, 1, 3 and 5) because if it writes the primitive block to chunks 1, 3 and 5 the primitive block will not be accessible by a contiguous set of address. This issue may be addressed through the use of virtual memory.

As is known to those of skill in the art, virtual memory uses a virtual address space that defines virtual addresses that are translated into physical memory addresses (e.g. addresses within a physical memory). A unit (e.g. the storing unit) may reference a virtual memory address and a memory management unit (MMU) translates that virtual memory address to a physical memory address. An example method of managing access to physical memory via virtual memory, which may be used to manage access to the memory of the local transformed geometry buffer 311, is described in the Applicant's co-pending GB Patent Application No. 1810779.7 and is herein incorporated by reference in its entirety.

In the method described in GB Patent Application No. 1810779.7 the virtual memory is divided into chunks (e.g. pages) which are p times larger than the chunks (e.g. pages) of physical memory such that each virtual chunk (e.g. page) is mapped to p physical chunks (e.g. pages). A virtual address thus comprises information identifying the virtual chunk (e.g. page), information identifying the physical-sized chunk (e.g. page) within that virtual chunk; and an offset within that physical-sized chunk (e.g. page). Each physical-sized chunk (e.g. page) of a virtual chunk (e.g. page) is mapped to a physical chunk (e.g. page) via a virtual memory table. Thus each entry of the virtual memory table stores a mapping between a physical-sized chunk of a virtual chunk (e.g. page) and a physical chunk (e.g. page). Accordingly there are p entries in the virtual memory table per virtual chunk (e.g. page). In some cases, the virtual memory may be arranged as an array composed of sets of p entries where each set of p entries is associated with a virtual chunk (e.g. page). Virtual addresses are then translated to physical memory addresses using the virtual memory table. Details of how such a method may be implemented are described in the above-referenced patent application.

Such a method may be used to allow the primitive blocks to be allocated a contiguous set of memory addresses (i.e. virtual memory addresses) without requiring a contiguous block of physical memory. Specially, this can be achieved, for example, by having virtual memory chunks (e.g. pages) which are M+1 times larger than a chunk (e.g. page) of the physical memory of the local transformed geometry buffer (wherein each primitive block has a maximum size of M physical-sized chunks (e.g. pages)) and ensuring that a primitive block can only start in the first physical-sized chunk of a virtual chunk (e.g. page). It is assumed that for this virtual memory implementation that the maximum size of the primitive blocks can be enforced such that a primitive block will not exceed the specified maximum size. Therefore each virtual chunk (e.g. page) is mapped to M+1 physical chunks (e.g. pages). The M+1 physical chunks (e.g. pages) may be contiguous or non-contiguous. As a primitive block has a maximum size of M physical chunks, a primitive block will require a maximum of one virtual chunk (e.g. page) and a maximum of M contiguous or non-contiguous physical chunk (e.g. pages). In some cases, M may be four which limits the size of the primitive blocks to four physical chunks (e.g. pages) and the size of the virtual chunks (e.g. pages) to five physical chunks (e.g. pages). Ensuring that a primitive block can only start in the first physical-sized chunk (e.g. page) of a virtual chunk (e.g. page) ensures that any physical sized chunk will be written to a single virtual chunk (e.g. page). This ensures that any primitive block will be represented by a contiguous set of virtual addresses.

Figure 14:
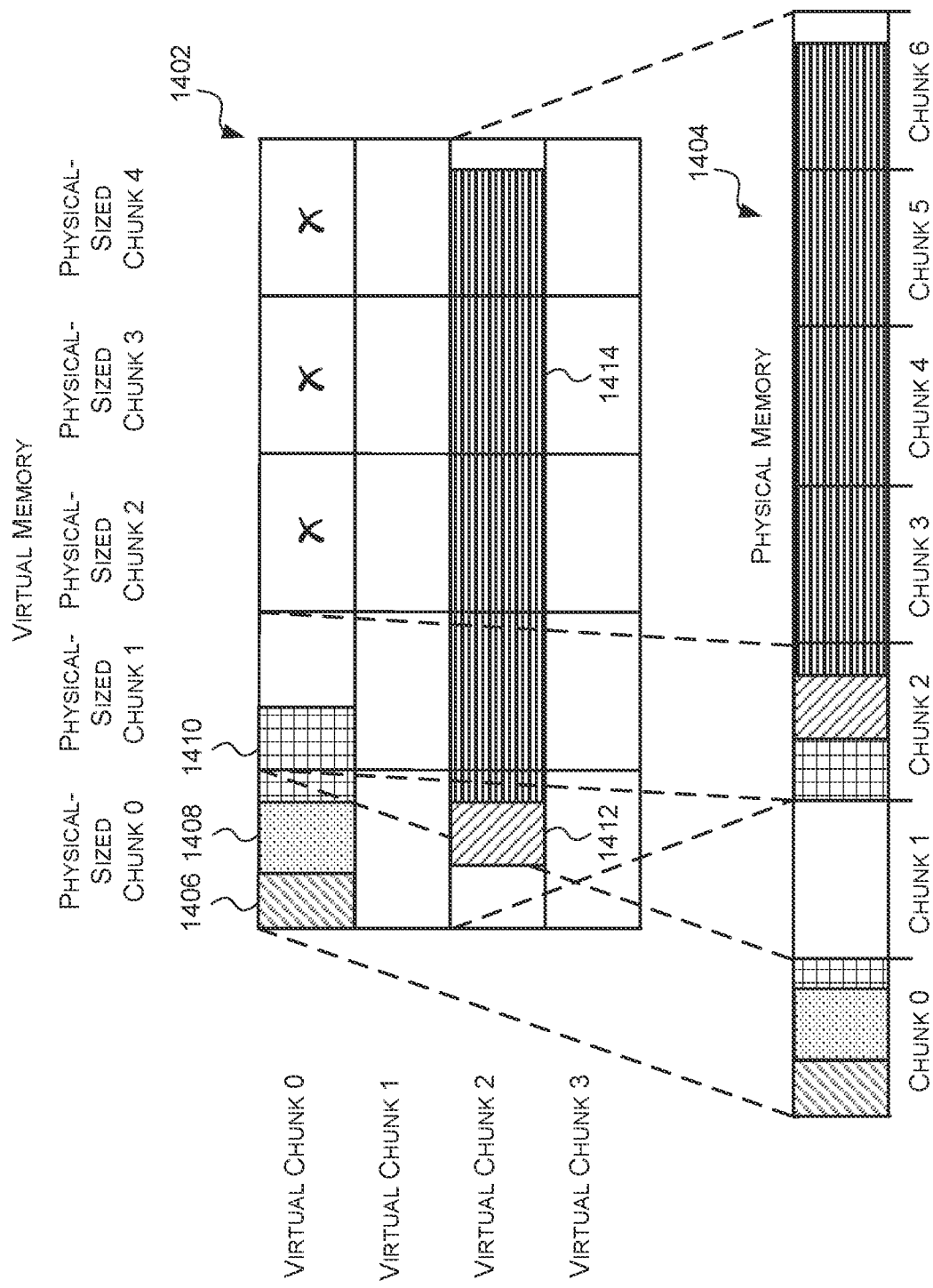
FIG. 14 is a schematic diagram illustrating an example method of using virtual memory to allocate physical memory of the local transformed geometry buffer to primitive blocks.

For example, FIG. 14 shows an example of allocating virtual memory 1402 to a set of primitive blocks. In this example, the physical memory 1404 is divided into seven equal-sized chunks (referred to herein as physical-sized chunks) numbered 0 to 6; each primitive block has a maximum size of 4 physical chunks (e.g. pages) (i.e. M=4); and the virtual memory 1402 is divided into four virtual chunks (e.g. pages) numbered 0 to 3 which are each divided into five physical-sized chunks (i.e. M+1=5). Each physical-sized chunk of virtual memory may be mapped to a physical chunk of memory; consecutive physical-sized chunks of virtual memory do not need to be mapped to consecutive chunks of physical memory; and more than one physical-sized chunk of virtual memory may be mapped to the same physical chunk of memory. For example, in FIG. 14 the first physical-sized chunk (e.g. page) of virtual chunk 0 is mapped to physical chunk 0, the second physical-sized chunk (e.g. page) of virtual chunk 0 is mapped to physical chunk 2, and the physical-sized chunks (e.g. pages) of virtual chunk 2 are mapped to physical chunks 2 to 6 respectively.

If a first primitive block 1406 is received that has a size that is less than a physical-sized chunk, the first primitive block 1406 may be allocated to a contiguous block of virtual chunk 0 starting at the beginning of physical-sized chunk 0. Since physical-sized chunk 0 of virtual chunk 0 is not full, if a second primitive block 1408 is subsequently received, the second primitive block 1408 may also be allocated a contiguous block of virtual chunk 0 starting at the next available address in physical-sized chunk 0. Since physical-sized chunk 0 of virtual chunk 0 is still not full, if a third primitive block 1410 is subsequently received, the third primitive block 1410 may be allocated a contiguous block of virtual chunk 0 starting from the next free address of physical-sized chunk 0. Even though this results in part of the third primitive block 1410 being written to physical chunk 0 and another portion of the third primitive block 1410 being written to physical chunk 2 the third primitive block 1410 is still allocated a contiguous block of virtual memory addresses.

Since physical-sized chunk 0 of virtual chunk 0 is now full, no further primitive blocks are allocated to virtual chunk 0 because it cannot be guaranteed that they will fit in virtual chunk 0 (i.e. it cannot be guaranteed that they will be allocated a contiguous set of virtual addresses). Therefore, if a fourth primitive block 1412 is subsequently received it may be allocated a contiguous block of virtual chunk 2 starting at the next available address of physical-sized chunk 0. As physical-sized chunk 1 of virtual chunk 0 and physical-sized chunk 0 of virtual chunk 2 are mapped to the same physical chunk the next available address of physical-sized chunk 0 of virtual chunk 2 is not the beginning address of physical-sized chunk 0 but the first address after the portion of the physical memory taken up by the third primitive block. Since physical-sized chunk 0 of virtual chunk 2 is not full, if a fifth primitive block 1414 is subsequently received it may also be allocated a contiguous block of virtual chunk 2 starting at the next available address of physical-sized chunk 0 of virtual chunk 2. Even though the fifth primitive block 1414 is of the maximum size (i.e. size M*physical-sized chunk) it will be guaranteed that it will fit in virtual chunk 2.

In these cases, the primitive identifier that is stored in a queue may comprise the virtual address of the primitive block which the primitive forms part of and information identifying the location of the primitive within the primitive block (e.g. an index into the primitive block). When the rasterization logic, the output unit, or a lower level sorting unit then wants to obtain the transformed geometry data related to a primitive the MMU translates the virtual address associated with that primitive to a physical address and the physical address is used to locate the primitive block in the local transformed geometry buffer. The primitive block offset or index is then used to locate the data related to the primitive in the primitive block.

Figure 15:
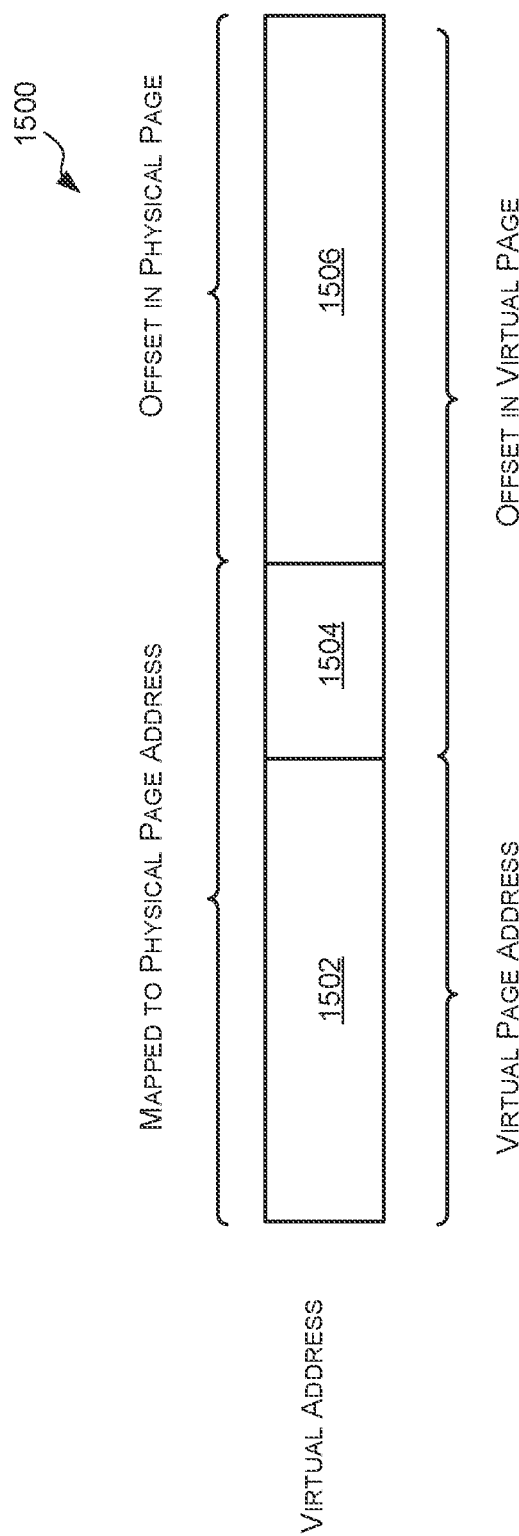
FIG. 15 is a schematic diagram illustrating an example format of a virtual address.

An example format for the virtual address 1500 is shown in FIG. 15. In this example the virtual address 1500 is divided into three sections 1502, 1504 and 1506. The first section 1502 is used to identify the address of the virtual chunk (e.g. virtual page). The number of bits in the first section dictates the number of virtual chunks (e.g. virtual pages). In some examples, there may be six bits in the first section which allows sixty-four virtual chunks (e.g. virtual pages). The second section 1504 identifies the physical-sized chunk (e.g. page) within the virtual chunk at which the data/primitive block is located. As described above, each virtual chunk (e.g. virtual page) is comprised of M+1 physical-sized chunks. A minimum of $\lceil \log_2(M+1) \rceil$ bits are required to uniquely identify M+1 different physical-sized chunks. Accordingly when M is 4 the second section 1504 may comprise three bits. The third section 1506 is used to specify the offset within the identified physical-sized chunk at which the data/primitive block is located. The combination of the first and second sections 1502 and 1504 represent a physical-sized chunk (e.g. page) and thus it is the combination of the first and second sections 1502 and 1504 that is mapped to a physical chunk (e.g. page). The combination of the second and third sections 1504 and 1506 represent the offset within the virtual chunk (e.g. page).

Figure 16:
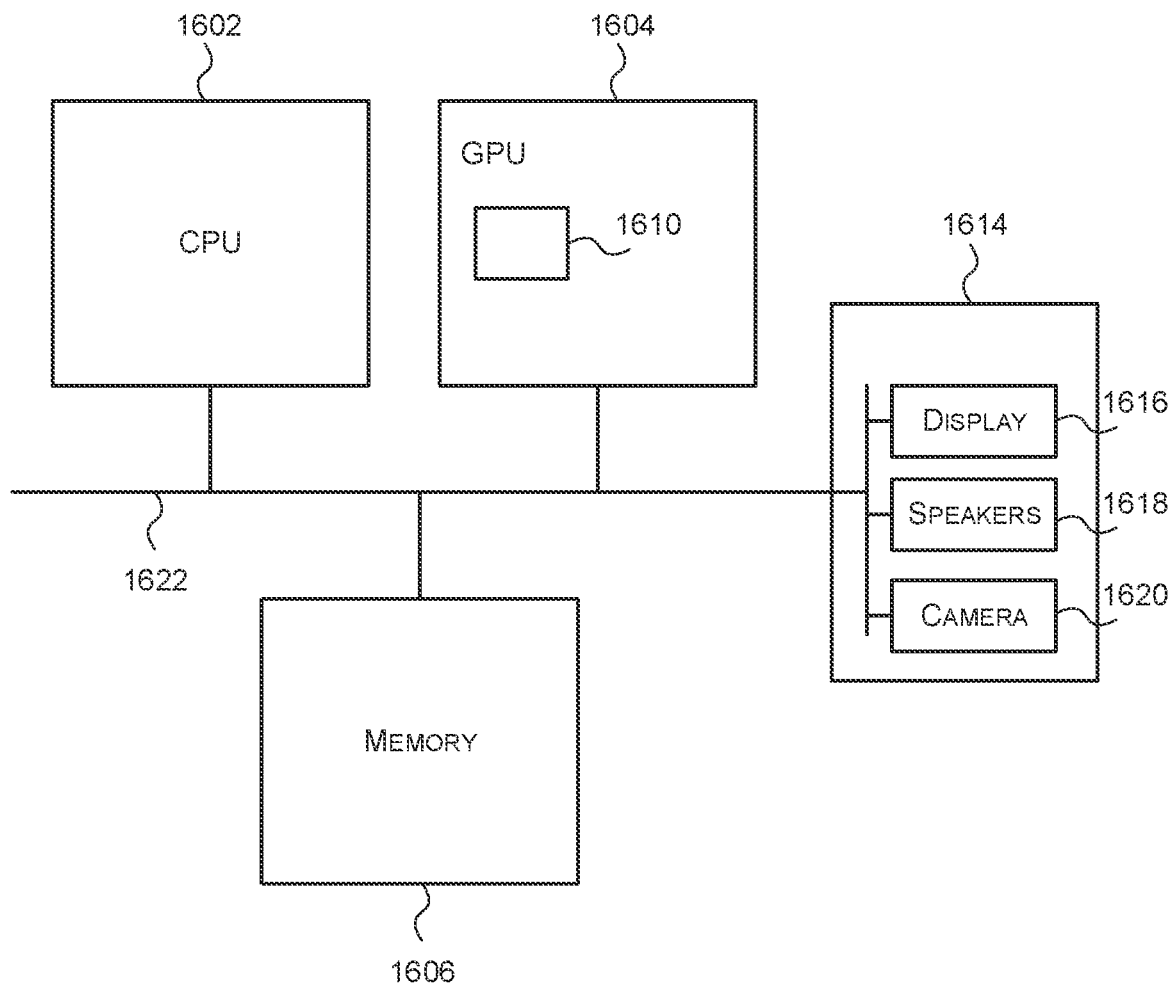
FIG. 16 is a block diagram of an example computer system in which the tiling engines or the graphics processing systems described herein may be implemented.

FIG. 16 shows a computer system in which the tiling engines and/or graphics processing systems described herein may be implemented. The computer system comprises a CPU 1602, a GPU 1604, a memory 1606 and other devices 1614, such as a display 1616, speakers 1618 and a camera 1620. A processing block 1610 (which may correspond to a tiling engine and/or graphics processing system described herein) is implemented on the GPU 1604. In other examples, the processing block 1610 may be implemented on the CPU 1602. The components of the computer system can communicate with each other via a communications bus 1622.

The tiling engines and graphics processing systems of FIGS. 1-4 and 10 are shown as comprising a number of functional blocks. This is schematic only and is not intended to define a strict division between different logic elements of such entities. Each functional block may be provided in any suitable manner. It is to be understood that intermediate values described herein as being formed by the tiling engine or graphics processing system, need not be physically generated by the tiling engine or the graphics processing system at any point and may merely represent logical values which conveniently describe the processing performed by the tiling engine or graphics processing system between its input and output.

The tiling engines and graphics processing systems described herein may be embodied in hardware on an integrated circuit. The tiling engines and graphics processing systems described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, byte-code, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a tiling engine or graphics processing system configured to perform any of the methods described herein, or to manufacture a tiling engine or graphics processing systems comprising any apparatus described herein. An integrated circuit definition dataset may be, for example, an integrated circuit description.

Therefore, there may be provided a method of manufacturing, at an integrated circuit manufacturing system, a tiling engine or a graphics processing system as described herein. Furthermore, there may be provided an integrated circuit definition dataset that, when processed in an integrated circuit manufacturing system, causes the method of manufacturing a tiling engine or a graphics processing system to be performed.

An integrated circuit definition dataset may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS® and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a tiling engine or a graphics processing system will now be described with respect to FIG. 17.

Figure 17:
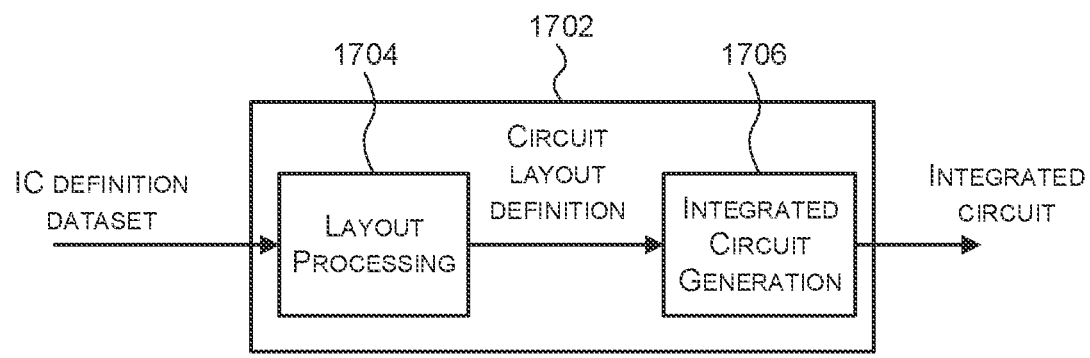
FIG. 17 is a block diagram of an example integrated circuit manufacturing system for generating an integrated circuit embodying the tiling engines and/or the graphics processing systems described herein.

FIG. 17 shows an example of an integrated circuit (IC) manufacturing system 1702 which is configured to manufacture a tiling engine, or a graphics processing system as described in any of the examples herein. In particular, the IC manufacturing system 1702 comprises a layout processing system 1704 and an integrated circuit generation system 1706. The IC manufacturing system 1702 is configured to receive an IC definition dataset (e.g. defining a tiling engine or a graphics processing system as described in any of the examples herein), process the IC definition dataset, and generate an IC according to the IC definition dataset (e.g. which embodies a tiling engine or a graphics processing system as described in any of the examples herein). The processing of the IC definition dataset configures the IC manufacturing system 1702 to manufacture an integrated circuit embodying a tiling engine or a graphics processing system as described in any of the examples herein.

The layout processing system 1704 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1704 has determined the circuit layout it may output a circuit layout definition to the IC generation system 1706. A circuit layout definition may be, for example, a circuit layout description.

The IC generation system 1706 generates an IC according to the circuit layout definition, as is known in the art. For example, the IC generation system 1706 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1706 may be in the form of computer-readable code which the IC generation system 1706 can use to form a suitable mask for use in generating an IC.

The different processes performed by the IC manufacturing system 1702 may be implemented all in one location, e.g. by one party. Alternatively, the IC manufacturing system 1702 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a tiling engine or a graphics processing system without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 17 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 17, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A method of storing transformed primitives in a geometry processing phase implemented by a graphics processing system, the method comprising:
   maintaining a plurality of primitive blocks, wherein each primitive block of the plurality of primitive blocks is associated with a different one of a plurality of fixed macro regions of a render space;
   receiving a transformed primitive in the render space;
   determining which of the plurality of fixed macro regions the transformed primitive at least partially falls within;
   adding the transformed primitive to at least one primitive block of the plurality of primitive blocks, which is associated with a fixed macro region that the transformed primitive at least partially falls within;
   determining whether each primitive block of the at least one primitive block is full; and
   in response to determining that a primitive block of the at least one primitive block is full, storing the primitive block in a local transformed geometry buffer of the graphics processing system for use in a rasterization phase implemented by the graphics processing system, and starting a new primitive block for the fixed macro region associated with the primitive block.

2. The method of claim 1, further comprising, if the transformed primitive at least partially falls within at least two macro regions, selecting a primitive block associated with one of the at least two macro regions to add the transformed primitive to.

3. The method of claim 1, wherein the transformed primitive is added to the primitive block associated with each of the macro regions that the transformed primitive at least partially falls within.

4. The method of claim 1, further comprising maintaining a reference counter for each primitive block stored in the local transformed geometry buffer that indicates whether the primitive block can be removed from the local transformed geometry buffer.

5. The method of claim 1, wherein a primitive block associated with a macro region is determined to be full when:
   that primitive block has a maximum size,
   that primitive block comprises a maximum number of transformed primitives, and/or
   each transformed primitive is associated with one or more vertices and that primitive block comprises a maximum number of vertices.

6. The method of claim 1, wherein a memory of the local transformed geometry buffer is divided into a plurality of chunks and a primitive block is only stored in a same chunk of the local transformed geometry buffer as another primitive block when the primitive block and the other primitive block are associated with a same macro region of the plurality of macro regions.

7. The method of claim 6, further comprising maintaining a reference counter for each chunk that identifies whether data in that chunk can be overwritten.

8. The method of claim 1, wherein:
   a memory of the local transformed geometry buffer is divided into a plurality of physical chunks of size K;
   a virtual memory is divided into a plurality of virtual memory chunks of size (M +1) * K, each virtual memory chunk being mapped to (M+1) physical chunks, wherein a maximum size of a primitive block is M * K wherein M is an integer greater than or equal to two; and
   storing a primitive block in the local transformed geometry buffer comprises writing the primitive block to a virtual memory chunk only if the primitive block starts in a first K-sized block of the virtual memory chunk.

9. The method of claim 1, wherein the render space is divided into a plurality of tiles and each macro region comprises at least two of the plurality of tiles.

10. The method of claim 1, further comprising, prior to storing the primitive block in the local transformed geometry buffer, determining if there is enough free space in the local transformed geometry buffer to store the primitive block, and only storing the primitive block in the local transformed geometry buffer if it is determined that there is enough free space.

11. The method of claim 1, wherein adding a transformed primitive to a primitive block comprises adding transformed geometry data related to the transformed primitive to the primitive block.

12. The method of claim 11, wherein the transformed geometry data related to a transformed primitive comprises transformed vertex information for each of a plurality of vertices.

13. The method of claim 1, wherein the graphics processing system is a hybrid rendering graphics processing system.

14. A storing unit for use in a graphics processing system, the storing unit comprising logic configured to, in a graphics processing phase implemented by a graphics processing system:
   maintain a plurality of primitive blocks, wherein each primitive block of the plurality of primitive blocks is associated with a different one of a plurality of fixed macro regions of a render space;
   receive a transformed primitive in render space;
   determine which of the plurality of fixed macro regions the transformed primitive at least partially falls within;

add the transformed primitive to at least one primitive block of the plurality of primitive blocks, which is associated with a fixed macro region that the transformed primitive at least partially falls within;

determine whether each of the at least one primitive block is full; and in response to determining that a primitive block of the at least one primitive block is full, store the primitive block in a local transformed geometry buffer of the graphics processing system for use in a rasterization phase implemented by the graphics processing system and start a new primitive block for the fixed macro region associated with the primitive block.

15. A tiling engine for use in a graphics processing system, the tiling engine comprising:

the storing unit as set forth in claim 14; and a chain of sorting units configured to sort transformed primitives into successively smaller regions of the render space using a set of queues, each sorting unit in the chain configured to sort transformed primitives into a plurality of regions by storing in a queue associated with each of the plurality of regions, information identifying the primitive blocks that comprise the transformed primitives that at least partially fall within that region.

16. The tiling engine of claim 15, wherein the information identifying a primitive block comprises information identifying a location of the primitive block in the local transformed geometry buffer.

17. The tiling engine of claim 15, wherein the chain of sorting units is configured to remove information identifying a primitive block from a queue when the information identifying the primitive block is added to one or more other queues or when the information identifying a primitive block is sent to rasterization logic of the graphics processing unit for processing a tile, and the tiling engine is configured to maintain a reference counter for each primitive block stored in the local transformed geometry buffer that indicates when that primitive block can be removed from the local transformed geometry buffer by:

incrementing the reference counter for a primitive block when information identifying that primitive block is added to a queue;

decrementing the reference counter for a primitive block when information identifying the primitive block is removed from a queue;

incrementing the reference counter for a primitive block when information identifying the primitive block is sent to the rasterization logic for processing a tile; and decrementing a reference counter for a primitive block when the rasterization logic completes processing of the primitive block for a tile.

18. A graphics processing system comprising the storing unit as set forth in claim 14.

19. A non-transitory computer readable storage medium having stored thereon computer readable instructions that, when executed at a computer system, cause the computer system to perform the method as set forth in claim 1.

20. A non-transitory computer readable storage medium having stored thereon a computer readable dataset description of the storing unit as set forth in claim 14 that, when processed in an integrated circuit manufacturing system, causes the integrated circuit manufacturing system to manufacture an integrated circuit embodying the storing unit.

* * * * *